(12) United States Patent
Geiger

(10) Patent No.: US 8,281,461 B2
(45) Date of Patent: Oct. 9, 2012

(54) BUTTON HEAD TIE

(75) Inventor: Gerard G. Geiger, Jackson, WI (US)

(73) Assignee: Hellermanntyton Corporation, Milwaukee, WI (US)

( * ) Notice: Subject to any disclaimer, the term of this patent is extended or adjusted under 35 U.S.C. 154(b) by 209 days.

(21) Appl. No.: 12/478,863

(22) Filed: Jun. 5, 2009

(65) Prior Publication Data

US 2010/0306967 A1 Dec. 9, 2010

(51) Int. Cl.
*B65D 63/10* (2006.01)

(52) U.S. Cl. ..... 24/16 PB; 24/16 R; 24/17 A; 24/17 AP; 24/458

(58) Field of Classification Search ............. 24/17 A, 24/17 AP, 16 PB, 16 R, 458
See application file for complete search history.

(56) References Cited

U.S. PATENT DOCUMENTS

| | | | |
|---|---|---|---|
| 3,258,819 A | | 7/1966 | Weckesser |
| 3,537,146 A | * | 11/1970 | Caveney .................... 24/16 PB |
| 3,900,922 A | | 8/1975 | McCormick |
| 4,557,023 A | * | 12/1985 | Six et al. ..................... 24/16 PB |
| 4,735,387 A | * | 4/1988 | Hirano et al. .................... 248/71 |
| 4,805,856 A | * | 2/1989 | Nicoli et al. .................. 248/74.3 |
| 5,386,615 A | * | 2/1995 | Bernard ....................... 24/16 PB |
| 5,759,004 A | * | 6/1998 | Kuffel ............................ 411/508 |
| 6,347,435 B1 | | 2/2002 | Davignon et al. |
| 6,530,126 B2 | * | 3/2003 | Caveney et al. ............. 24/16 PB |
| 6,533,226 B2 | * | 3/2003 | Geiger .......................... 248/74.3 |
| 7,661,633 B2 | * | 2/2010 | Igarashi et al. .............. 248/74.3 |
| 2008/0250609 A1 | * | 10/2008 | Franks ........................... 24/16 R |

* cited by examiner

*Primary Examiner* — Robert J Sandy
*Assistant Examiner* — David Upchurch
(74) *Attorney, Agent, or Firm* — Joseph S. Heino; Patrick M. Bergin

(57) ABSTRACT

A button head tie has a button head and a tie strap. The button head is a generally flat member having an aperture for receiving the tie strap. The aperture includes lead-in ramps to facilitate tie strap insertion and is configured to prevent angled tie strap insertion. The tie strap is a flat elongate member having a wedge that is captured within the aperture. The remainder of the strap passes through the aperture. The wedge and strap have teeth and serrations on both sides, respectively, the teeth and serrations being engageable. In use, the strap is looped around a bundle and inserted into the aperture to either side of the wedge. Strap insertion force is reduced by standoff tabs which elevate the wedge out of aperture, temporarily, during installation. When loop tension is applied to the bundle, the wedge is pulled into the aperture, compressively locking the strap.

39 Claims, 19 Drawing Sheets

FIG. 2A
FIG. 2B
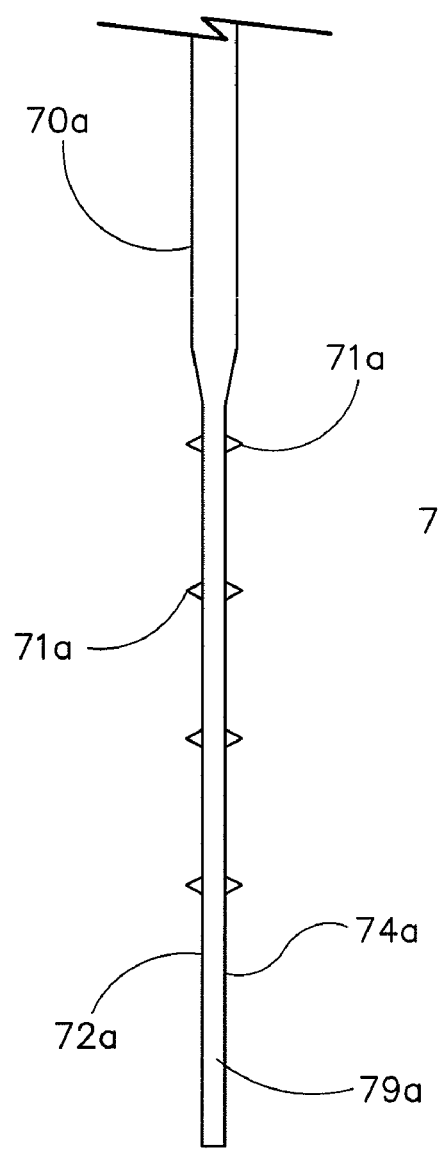
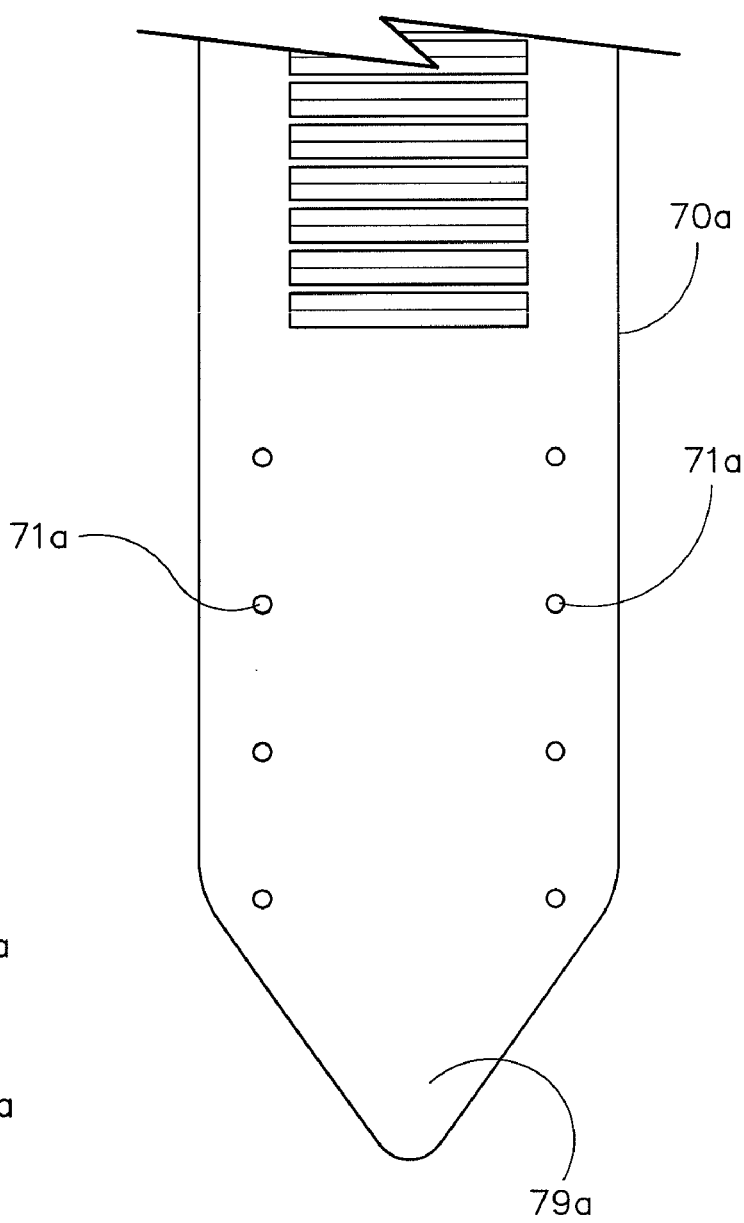

BUTTON HEAD TIE

FIELD OF THE INVENTION

This invention relates generally to devices used to bundle and secure elongated items such as wires, cables, hoses, and the like, together and also to attach the bundle to a mounting surface. More particularly, it relates to a new and improved button head tie which includes a uniquely configured wedge at one end of the elongate tie strap component. The improved button head component is uniquely configured with a new aperture for receiving the tie strap wedge and a portion of the tie strap within it for securing a bundle of elongated items to a mounting surface. Further the button head is greatly reinforced with a radial truss work structure.

BACKGROUND OF THE INVENTION

Molded plastic cable ties are known in the art and are used to secure a variety of elongated items such as wires, cables, hoses, tubes, in tight bundles. Specialized button head ties are also known in the art. A button head tie is essentially a plastic tie strap product constructed from two individual pieces, a flexible tie strap and a rigid button head. The strap is molded with a tail finger grip on one end and a wedge-shaped pawl, or wedge, on the other end that locks into the button head when both the wedge and the strap are passed through an aperture in the button head and then driven into the button head. Serrations extend along a portion of the length of the tie strap and are transversely defined within the tie strap between longitudinally-extending side rails, all features being duplicated on both sides of the tie strap. The button head may be round or any other shape with the aperture defined within the button head to accept the tie strap. The wedge also has teeth on it that are functionally adapted to engage with the serrations on the tie strap when the strap is looped back through the aperture of the button head. The button head aperture typically provides two-angled surfaces that substantially match the angles of the wedge. When the teeth of the wedge are engaged with the serrations of the tie strap and the bundle becomes tight, the wedge is driven downwardly into the head aperture thereby pinching and locking it against a portion of the tie strap. This type of button head tie is considered to be "bi-directional" because all the strap features are duplicated on both sides; thus allowing the strap to be inserted and fed through the aperture opening on either side of the wedge for engagement and bundling, which makes assembly faster and easier. Such button head ties serve to secure the resulting bundle to an adjacent structural member such as a vehicle frame rail, firewall, fender, body panel, bracket or the like. The strap encircles the items to be bundled and is secured by the wedge driving down into the button head and against the strap at the internal ramp of the button head. The button head, in turn, can extend into and bear against a hole that is formed in the structural member.

Button head ties are effective, convenient and easy to use. However, button head ties of current design and manufacture have several problems associated with their use. For example, it has been found that tie straps that are relatively thick and that have relatively narrow side rails are much more susceptible to bending shear stresses and tie strap breakage. It has also been found that tie straps that have serrations with relatively sharp corners, or peaks, tend to produce high stress concentrations along the tie strap, also making them much more susceptible to tie strap breakage. Also observed in previous button head tie strap designs is the fact that tie straps can be inadvertently inserted at an angle into the button head aperture. This is due to the internal geometry of the button head aperture side walls which forms excessive clearance for the strap width. During inadvertent angled strap insertion, proper engagement of the strap serrations with the wedge teeth is not possible which results in unexpected release of the bundle. Button head ties of previous designs and manufacture also limit the overall tensile strength of the loop formed by the tie strap. An example of this common type of button head tie is illustrated and claimed in U.S. Pat. No. 4,557,023 to Six et al. (the '023 patent). In the '023 patent, the button head includes a shelf or step (26) that functionally cooperates with a step surface (19) that is defined within each of the supporting edges (14) of the wedge (4). See FIGS. 1, 2, 4 and 5 of the '023 patent. Another example of a button head tie is illustrated and claimed in U.S. Pat. No. 5,386,615 to Bernard (the '615 patent). In the '615 patent, the button head similarly includes stops (44) that functionally cooperate to seat a locking head (20) of the strap (12). The wedge-shaped locking head (20) seated on stops (44) within the narrowing aperture (26) does not leave enough space for the strap (12) to be inserted back through without unseating the locking head (20). See FIG. 5 of the '615 patent. When the strap (12) is further tightened around a bundle, the locking head (20) is pulled back down and seated against the stops (44). See FIG. 6 of the '615 patent.

Subsequently, this inventor has realized that the entire surrounding geometry, for both the button head and wedge, required to create the "shelf," "stop" or "step" configurations mentioned above enables the "unexpected release of the bundle" and, furthermore, limits the ultimate potential wedging action of the button head tie. If the wedging action is improved, higher forces will be encountered, thus requiring additional structural reinforcement within the button head. Also observed in previous designs is the difficulty of inserting the strap into the button head when the button head aperture is concealing the wedge because the button head is free to slide in the region of the wedge, thereby sometimes blocking the open passageway the strap is intended to pass through.

In the view of this inventor, extensive improvements to the button head tie of the prior art are needed.

SUMMARY OF THE INVENTION

It is, therefore, a principal object of this invention to provide a new and improved button head tie with increased reliability that consists of:
  Thinner more flexible strap to minimize strap brittleness and breakage.
  Wider strap rails to maintain required tensile strength of strap—due to the thinner strap.
  Wider strap rails to provide an adequate flow path for plastic material while filling the tie strap during the injection molding process—also necessary due to the thinner strap.
  Rounded strap serrations to prevent high critical stress concentrations along the entire serration length on the strap which further reduces the propensity of brittleness or strap breakage.
  Straight internal button head aperture geometry inline with the tie strap and the wedge to prevent angled insertion of the tie strap; thereby, insuring proper engagement of the strap serrations and the wedge teeth.
  Higher loop tensile strength which is due to the increased wedging functionality. Increased wedging is provided by (1) an increase in the wedge angle; (2) reconfiguration of the shelf, stop or step feature to allow unlimited wedging which provides a compressed engagement between the wedge teeth and the strap serrations; and (3) extensive strengthening of the button head with an internal network of trusses to resist the higher wedging forces.

Consistent low strap insertion force when the strap is inserted into button head between the aperture ramp and wedge. This is accomplished by eliminating the shelf or "step" feature and replacing it with temporary/collapsible standoff tabs that partially elevate the wedge out of the aperture—providing an opening for strap passage.

The present invention has attained each of the aforementioned objectives. The improvements will be apparent from the detailed description that follows.

BRIEF DESCRIPTION OF THE DRAWINGS

FIG. 1A is a front, top and right side perspective view of an alternative embodiment of the button head component illustrated in FIG. 1.

FIG. 2A is an enlarged partial right side elevational view of an alternative embodiment of the tie strap element illustrated in FIG. 2.

FIG. 2B is a front elevational view of the tie strap element shown in FIG. 2A.

DETAILED DESCRIPTION

Figure 1:
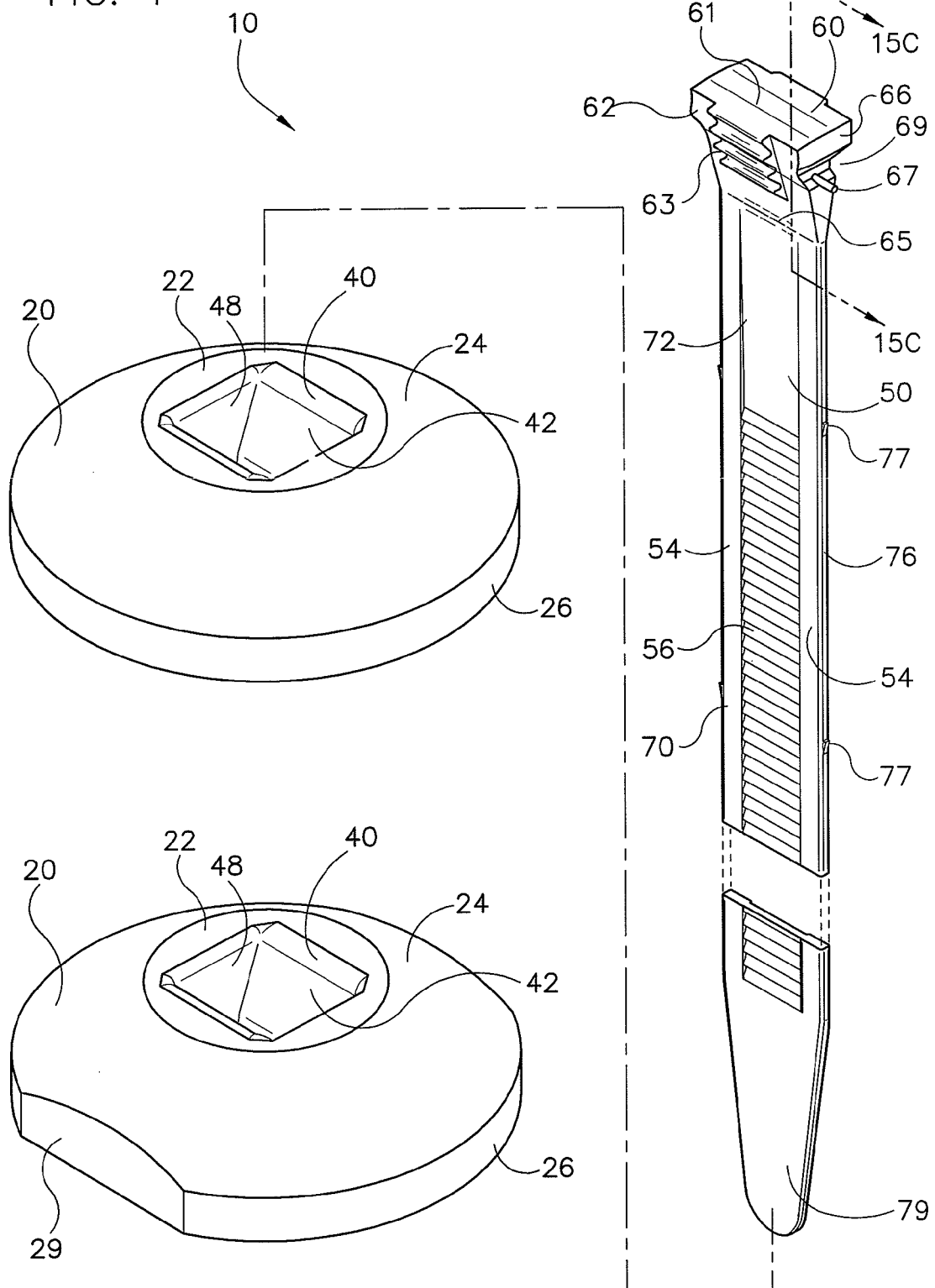
FIG. 1 is a front, top and right side perspective view of the button head and tie strap components of an improved button head tie that is constructed in accordance with the present invention.

Referring now to the drawings in detail, FIG. 1 illustrates the preferred embodiment of the new and improved button head tie 10 constructed in accordance with the present invention. The new and improved button head tie 10 includes two principal components: a button head, generally identified 20, and a tie strap, generally identified 50.

As shown in FIG. 1, the button head 20 includes a top surface 22, a spherical sloped portion 24 that extends downwardly from the top surface 22, and a circumferential rim 26. The top surface 22 of the button head 20 includes a centrally-disposed aperture 40, the aperture 40 extending fully through an otherwise solid, and axially-disposed, central hub 30 of the button head 20. See FIGS. 4-8 and 10. The button head 20 of the preferred embodiment also includes a substantially planar bottom base 28. The central hub 30 of the button head 20 extends from the top surface 22 to the planar bottom base 28. Extending further downwardly from the planar bottom base 28 and from the central hub 30 is an optional pilot bushing 32 which is integrally formed as part of the central hub 30. The pilot bushing 32 centers the button head 20 within a circular aperture 102 of a mounting structure 100 to which the button head tie 10 is typically attached. See FIGS. 13 and 14. Since applications for use of the improved button head tie 10 can differ, it is to be understood that the length and diameter of the pilot bushing 32 can be varied to accommodate apertures and structure depths of various dimensions. Furthermore, the pilot bushing 32 also provides some degree of protection for the tie strap 50 by preventing chaffing of the tie strap 50 against a burr edge 101 of the aperture 102.

As shown in FIG. 1A, an alternative embodiment of the button head 20 may be configured with opposing flats 29. This feature allows for a row of button heads 20 to more easily and reliably align or position themselves one next to the other in the event the button head tie 10 of the present invention is used, for example, in an automated assembly process.

Figure 10:
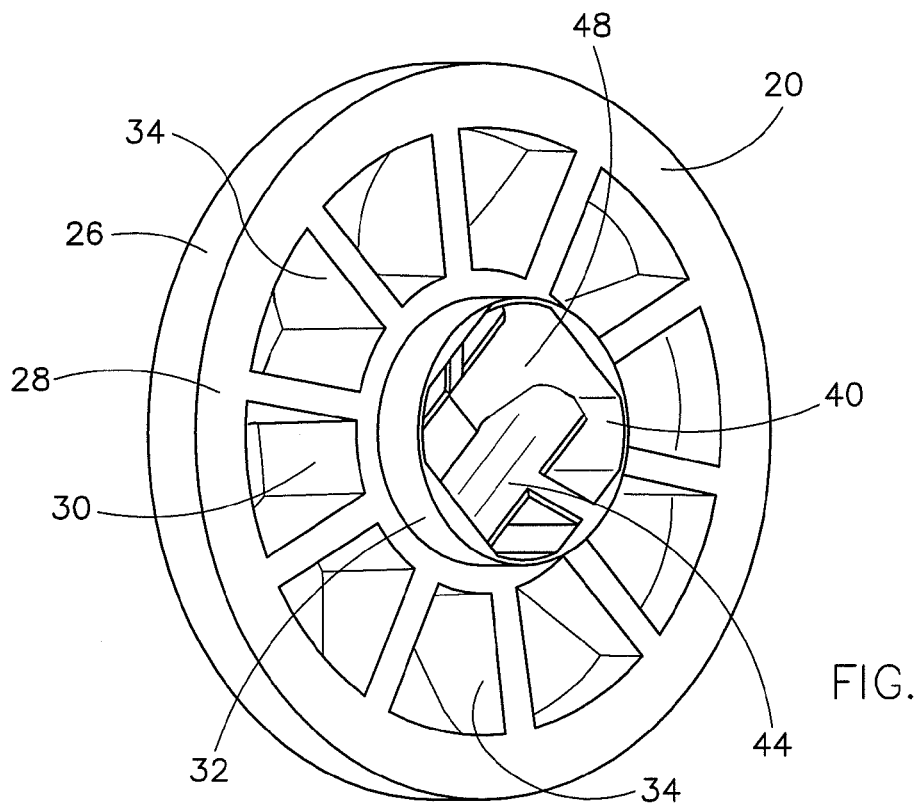
FIG. 10 is a bottom, front and left side perspective view of the button head component shown in FIG. 1.

As shown in FIG. 10, extending between the central hub 30 and the rim 26 of the button head 20, is a truss work of strategically-spaced and radially-disposed ribs 34 which is a new improvement to the button head tie 10. The presence of the ribs 34 provides structural strength to the button head 20 with less material than would be required if the button head 20 were fabricated from a single, solid piece of material. This allows the button head 20 to be relatively light-weight without sacrificing strength in the device. It should also be noted that the precise number, angle and spacing of such ribs 34 is not a limitation of the present invention. Ten such equally-spaced ribs 34 are illustrated, but more or less ribs 34 could be used, angled differently and/or spaced differently than shown without deviating from the scope of this invention. The ribs 34 serve to increase the overall loop tensile strength of an assembled button head tie 10 that is bundled around heavy elongate objects; e.g., wire harnesses, cables, hoses, or tubing that may be further subjected to impact loading if installed on a semi trailer that is bouncing while being hauled down the road or subjected to the pulsating hydraulic hoses on construction equipment, and other load fluctuating applications. It is to be understood that this truss work of ribs 34 results in a stronger button head 20 structure. The ribs 34 keep the button head 20 from splitting apart during high loading applications because the ribs 34 effectively transfer the wedging forces to the spherical sloped portion 24 and to the circumferential rim 26.

The centrally-disposed aperture 40 extends fully through the button head 20 within the central hub 30 from the top surface 22 to the pilot bushing 32. The shape of the aperture 40 at the top surface 22 and at the pilot bushing 32 is generally rectangular, and it varies in size while sectioning through the aperture 40 perpendicularly to the axis of the central hub 30. The side elevation profile of the aperture 40 is somewhat hourglass-shaped. See FIG. 7. As shown, the aperture 40 includes opposing lead-in ramps 42 extending inwardly and downwardly from the top surface 22 of the button head 20. Similarly, the aperture 40 includes opposing pair of lower lead-in ramps 44 that extend inwardly and upwardly from the pilot bushing 32. The upper lead-in ramps 42 and the lower lead-in ramps 44 are tapered inwardly and meet at a bottle-neck region 46, creating a point of maximum constriction within the aperture 40. The aperture 40 also includes a pair of opposing side walls 48 which are substantially parallel planar surfaces that are disposed generally perpendicularly to the ramps 42, 44.

Figure 15A:
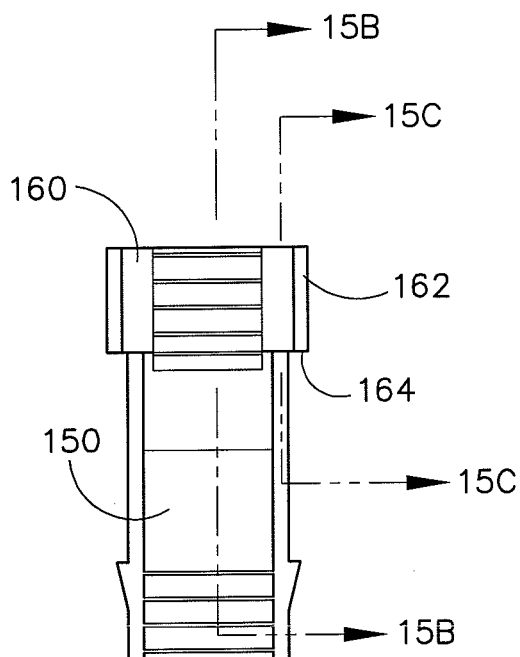
FIG. 15A is a front elevational view of a prior art button head tie strap.
Figure 15B:
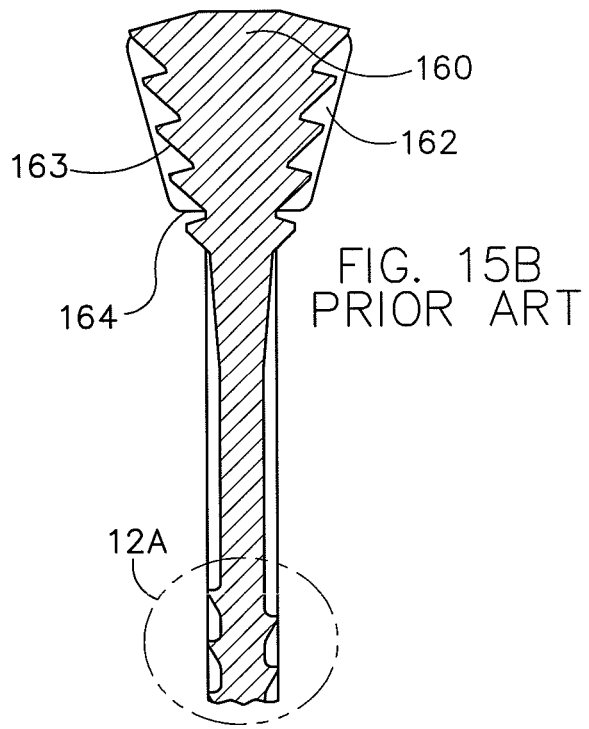
FIG. 15B is an enlarged and sectioned partial left side elevational view of the prior art button head tie strap shown in FIG. 15A and taken along line 15B-15B thereof.
Figure 15C:
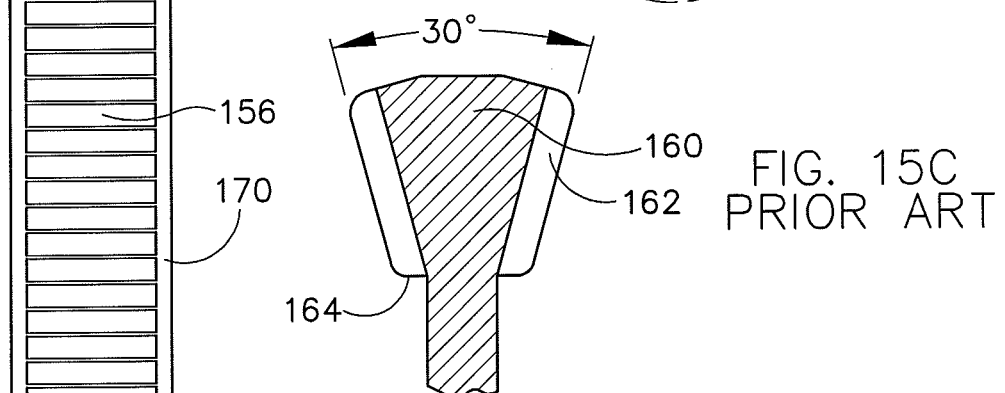
FIG. 15C is a view, similar to FIG. 15B, taken along line 15C-15C of FIG. 15A of the prior art button head tie strap.
Figure 16A:
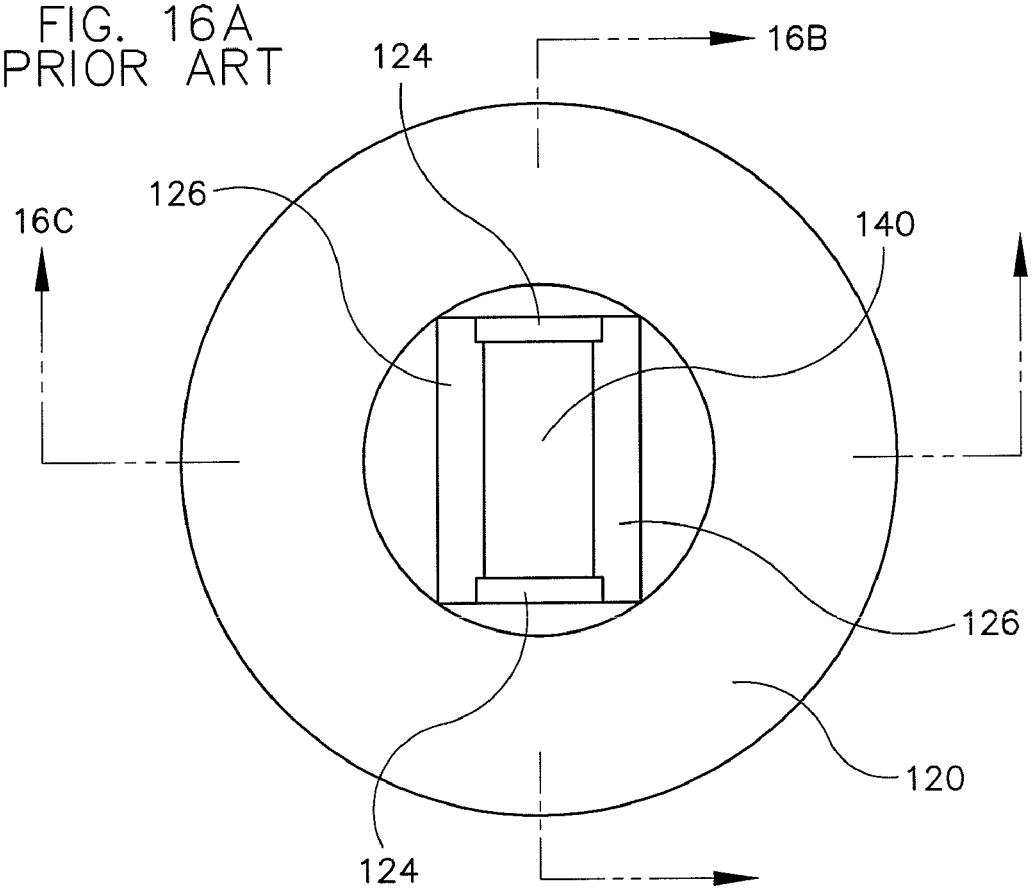
FIG. 16A is a top plan view of a prior art button head, of the type that would be used with the prior art button head tie strap illustrated in FIGS. 15A-15C.
Figure 16B:
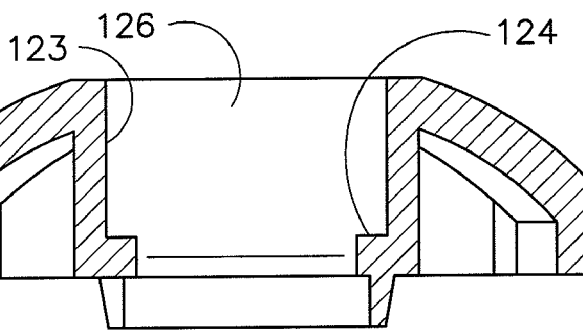
FIG. 16B is a sectioned left side elevational view of the prior art button head shown in FIG. 16A and taken along line 16B-16B thereof.
Figure 16C:
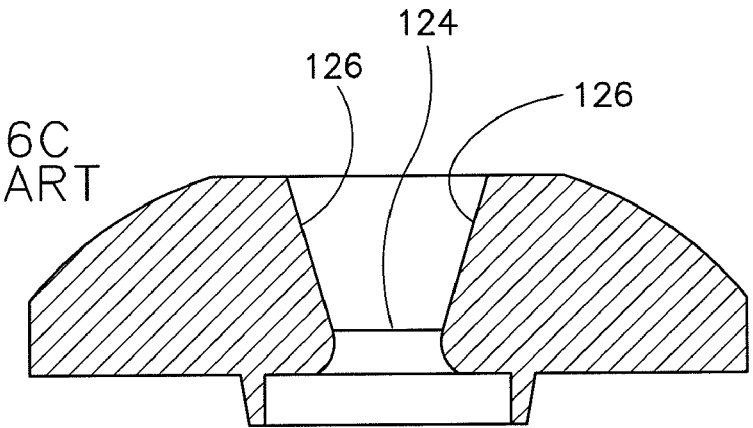
FIG. 16C is a sectioned front elevational view of the prior art button head shown in FIG. 16A and taken along line 16C-16C thereof.

FIGS. 16A-16C displays the prior art button head 120 which likewise includes a centrally-disposed aperture 140. The aperture 140 includes opposing lead-in ramps 126 and transversely-disposed shelves or "steps" 124. This prior art button head 120 is functionally adapted to be used with the tie strap, generally identified 150, as is shown in FIGS. 15A-15C. The structure of the new and improved button head 20 has extensive advancements over the prior art button head 120 shown as will become apparent later in this detailed description.

Referring back to FIG. 1, it will be seen that the tie strap 50 of the present invention is a generally longitudinally-extending member that includes a wedge 60 and an elongate portion 70. The wedge 60 is configured as a triangle-shaped pawl having a front face surface 62, a back face surface 64, and opposing side walls 66, 68. It should be noted that the tie strap 50 appears to be somewhat symmetrical in front-to-back and in side-to-side configuration. The front and back face surfaces 62, 64, respectively, of the wedge 60 each include a plurality of transversely-disposed teeth 63. The teeth 63 begin near or approximately at the top surface 61 of the wedge 60 and end near or approximately at a point 65 where the wedge 60 transitions to part of the elongate portion 70 of the tie strap 50. The opposing side walls 66, 68 of the wedge 60 each includes an outwardly extending stand-off tab 67. Above each stand-off tab 67 is a tab recess 69, the tab recess 69 allowing for receiving and housing of the corresponding tab 67 when the tab 67 is deformed and bent upwardly for reasons that will be apparent later in this detailed description.

Figure 19:
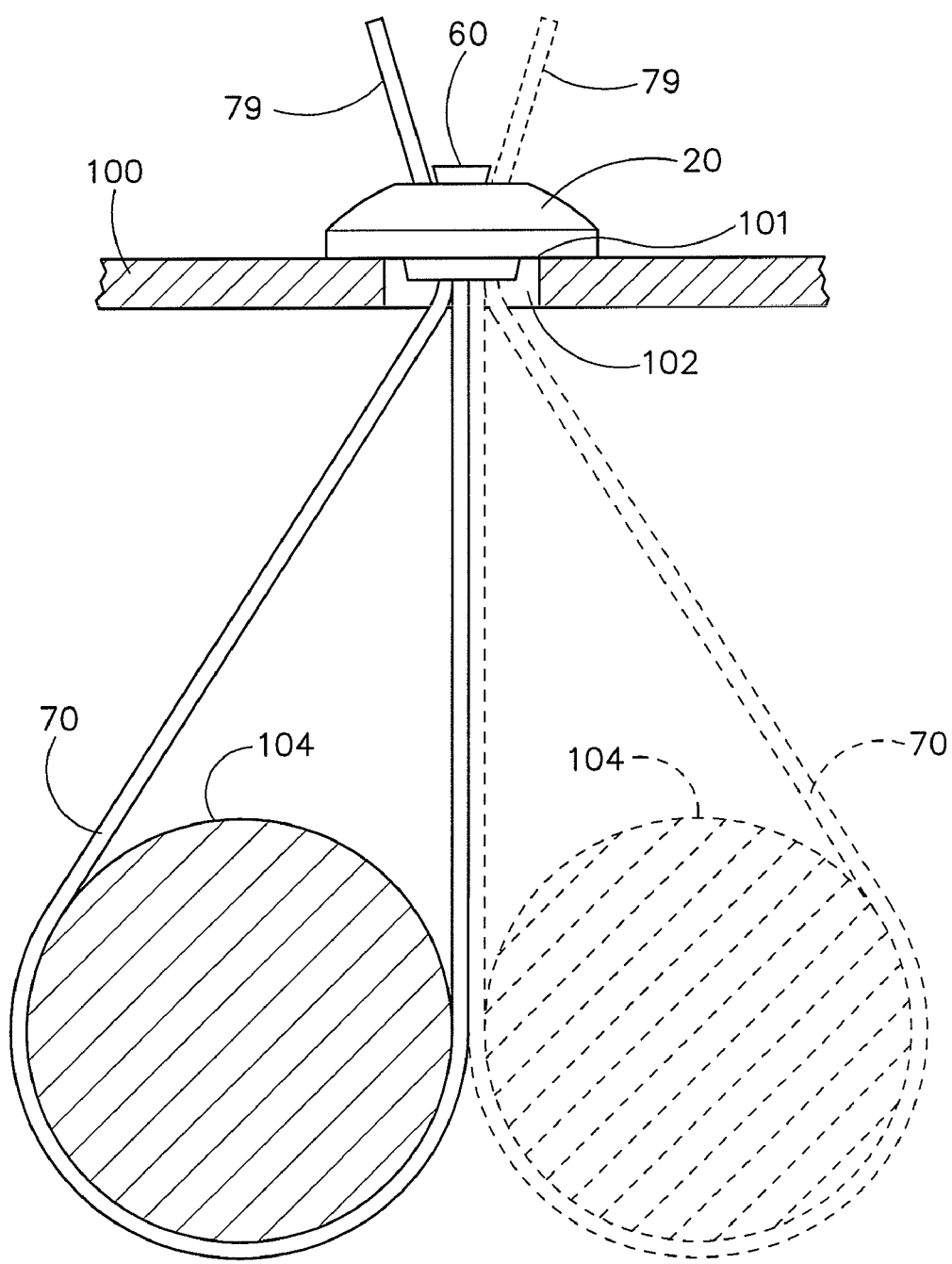
FIG. 19 is a side elevation view displaying the bi-directional capabilities of the prior art and the present invention button head tie due to the symmetrical/double sided strap, wedge and button head.

The elongate portion 70 of the tie strap 50 is a generally flat and longitudinally-extending, strip-like member that includes a front face surface 72 and a back face surface 74, the front and back face surfaces 72, 74, respectively, being similarly configured to allow for bi-directional use of the tie strap 50, as is shown in FIG. 19. While the front and back face surfaces 72, 74 are similarly configured, it should be noted that they are not exactly symmetrical front to back. See FIG. 8 and the detail of FIG. 12. That is, the serrations 56 on the surfaces 72 and 74 are effectively staggered by one-half of the serration 56 pitch between the front face surface 72 and the back face surface 74 to: (1) provide for a more uniform cross-sectional thickness, (2) provide minimum overall strap height and thickness, and (3) maintain a more uniform tensile strength. By offsetting the serrations 56 in this fashion, the overall strength of the elongate portion 70 of the tie strap 50 is not affected by otherwise opposing valleys between serrations 56 which can potentially create weak spots due to less cross-sectional area at those points. Given this configuration, only the features of the front face surface 72 will be described here, it being understood that the back face surface 74 includes similar features and detail.

Figure 12:
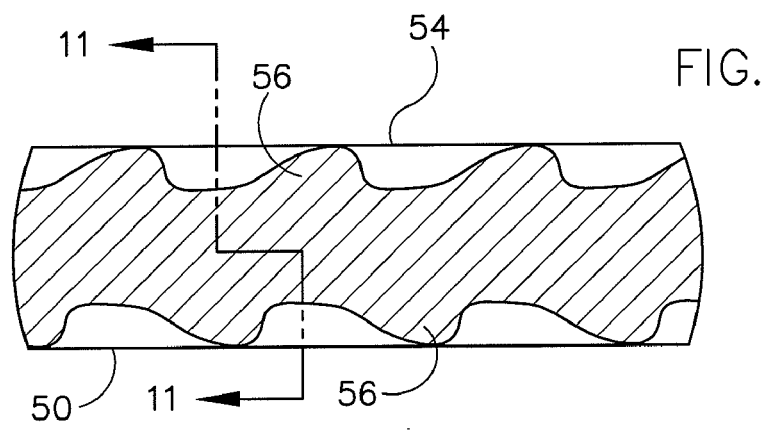
FIG. 12 is a greatly enlarged cross-sectioned side elevational view of a portion of the tie strap element taken within circle 12 of FIG. 8.
Figure 12A:
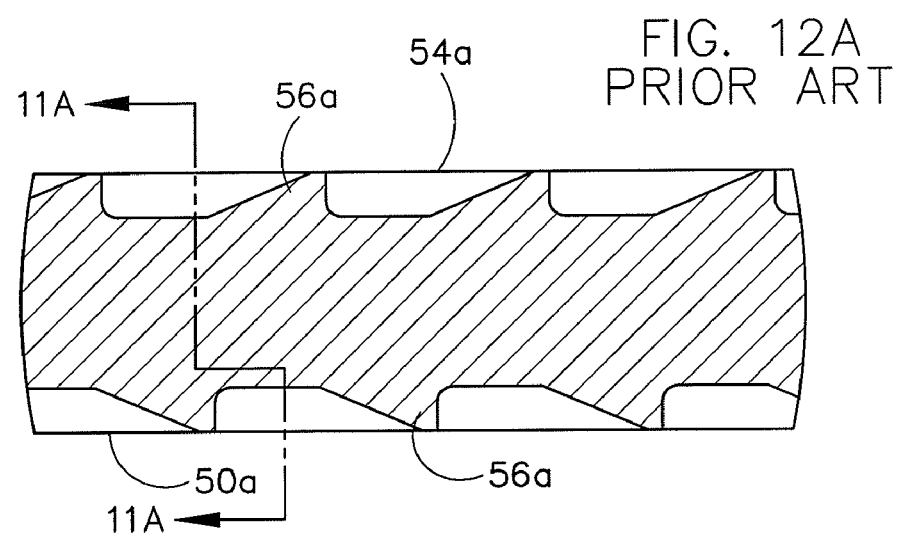
FIG. 12A is similar to FIG. 12 which is a greatly enlarged cross-sectioned side elevational view of a portion of the tie strap element taken within circle 12A of FIG. 15B a prior art button head tie strap.

As shown in FIG. 12, the serrations 56 of the tie strap 50 of the new and improved button head tie 10 are effectively rounded. In comparison, FIG. 12A depicts the prior art tie strap 50a serrations 56a which are not rounded.

Figure 11:
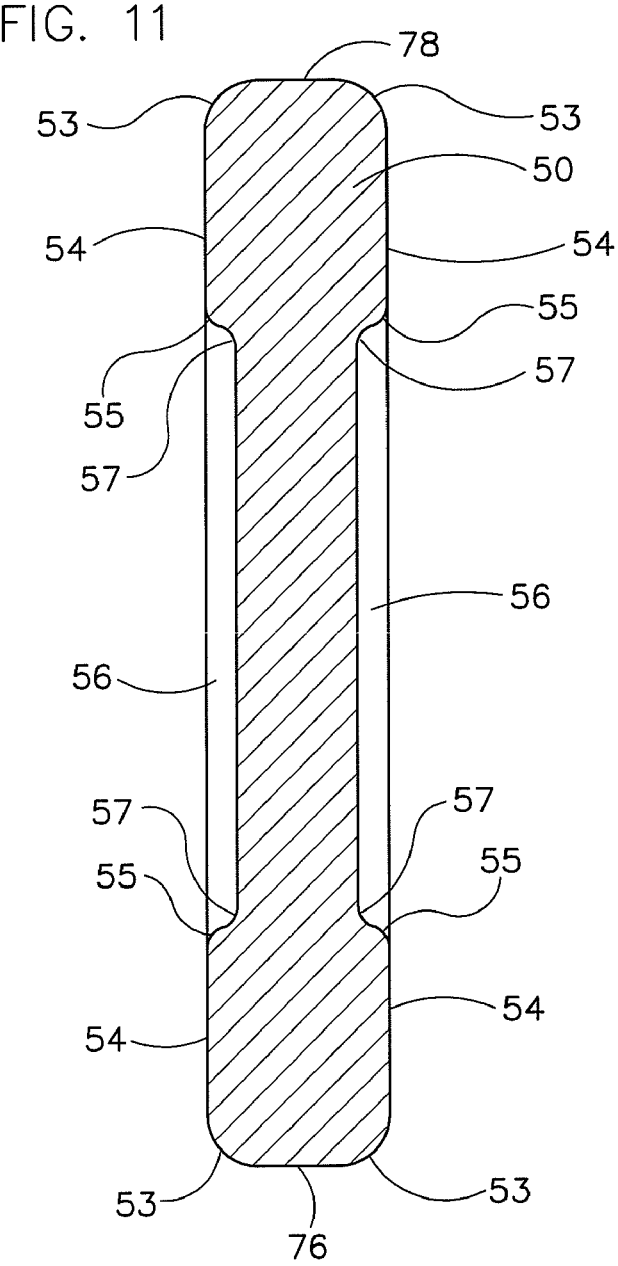
FIG. 11 is a greatly enlarged cross-sectioned top plan view of a portion of the tie strap element taken along line 11-11 of FIG. 12.

Furthermore, as shown in FIG. 1, the front face surface 72 of the elongate portion 70 of the tie strap 50 includes longitudinally-extending and opposing side rails 54. Disposed between the side rails 54 is a plurality of the transversely-disposed serrations 56. The cross section of the elongate portion 70 is shown in FIG. 11 cut from FIG. 12. As shown in FIG. 11, the transverse profile of the elongate portion 70 of the tie strap 50 illustrates that the side rails 54 include rounded outer edges 53 and rounded inner edges 55, 57 which eliminates sharp edges and helps reduce tie strap 50 breakage. Further in comparison, FIGS. 11A and 12A display the prior art tie strap 50a which shows the side rails 54a, with inward edges 55a, 57a being not rounded. Also rounded, on the improved tie strap, are the serrations 56 at the intersection of the rails 54 (not shown). The rounded inner edges 57 follow and fill in the undulating plurality of intersections.

Figure 8:
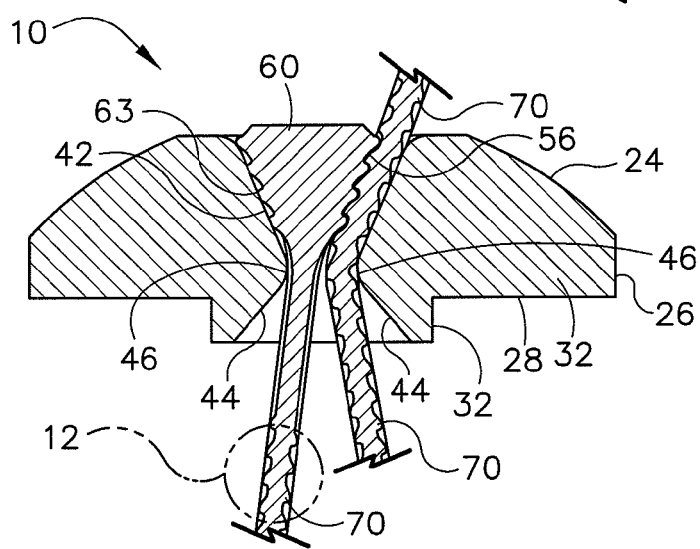
FIG. 8 is an enlarged cross-sectioned right side elevational view of the improved button head tie taken along line 8-8 of FIG. 6 displaying the wedge teeth engaged with the strap serrations and the wedge is seated.
Figure 9:
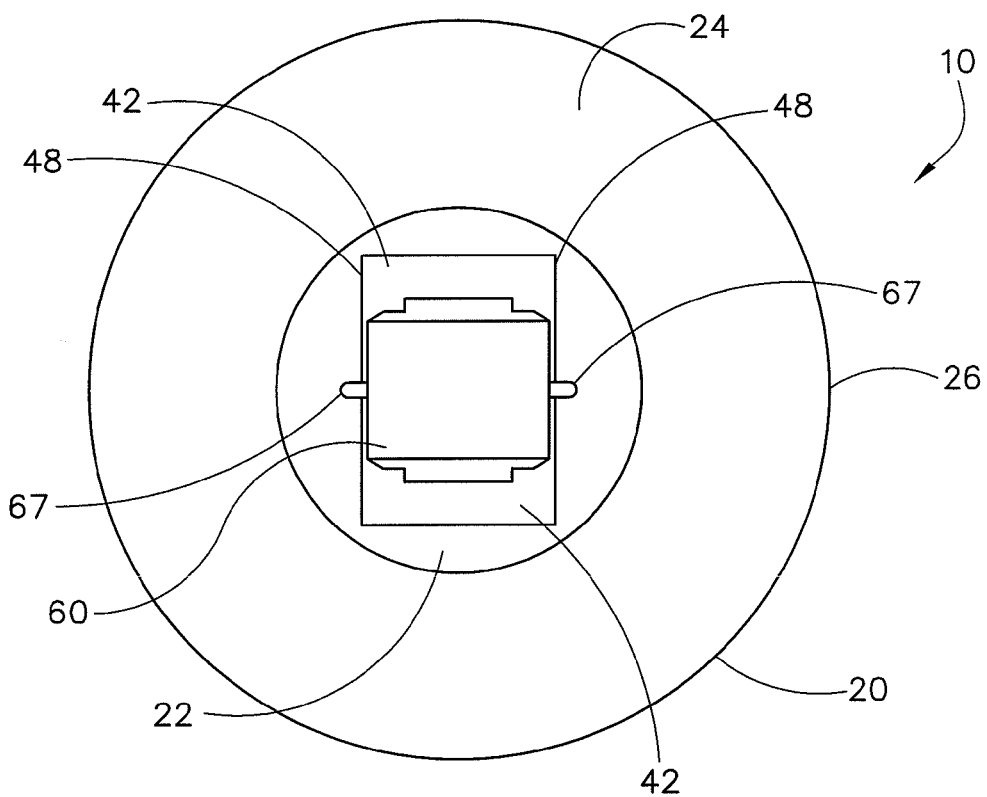
FIG. 9 is a top plan view of the improved button head tie illustrated in FIG. 2, displaying the components preassembled in the as received arrangement in preparation for installers to secure an elongated item or bundle of elongated items.

It is the inventor's experience that the rounding of the aforementioned prior art sharp corners/edges provides: (1) improved laminar material flow during the injection molding of the tie strap 50, (2) reduced critical stress concentrations at all of the sharp inside corners/edges along the entire strap length, and (3) superior tie strap 50 material performance properties. It should also be mentioned that the teeth 63 of the wedge 60 are similarly rounded providing for uniform mating engagement between the teeth 63 of the wedge 60 against the serrations 56 of the strap 50 as shown in FIG. 8.

The transverse length of each of the teeth 63 of the wedge 60 is slightly smaller than the transverse length of each of the serrations 56 on the strap 50 to insure the proper meshing or engagement of those elements. This prevents the teeth 63 of the wedge 60 from overlapping on the side rails 54 of the elongate portion 70, which would prevent proper seating of those elements and defeat the interlocking engagement of the serrations 56 and teeth 63.

Figure 11A:
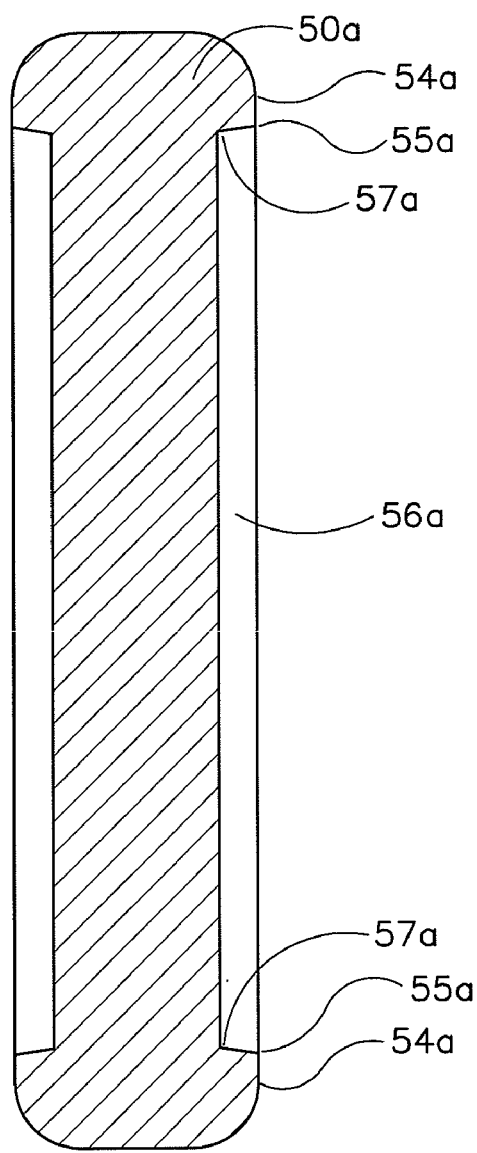
FIG. 11A is a view, similar to FIG. 11, of a portion of a prior art tie strap taken along line 11A-11A of FIG. 12A.

The inventor has determined that the thickness of the prior art strap in addition to the sharp edges contributed to the brittleness of the prior art tie strap 150. Envisioning the button head tie strap installation, it is to be understood that the tie strap(s) 150, 50 are looped around, sometimes, small bundle diameters. The cross section of the button tie strap (see FIGS. 12 and 12A) can be compared to a simple beam. Looping of the strap can be likened to the bending of a beam; the outside radius surface of the beam is in tension and the inside radius surface is subject to compression. When the beam height (thickness) is greater, as in the prior art tie strap 150, the tension and compression stress is multiplied. For easy comparison, it should be noted that the scale of FIGS. 12 and 12A are the same, and likewise the scale of FIGS. 11 and 11A are the same. If we now add bending the strap during dry conditions—dry nylon becomes less flexible. The resultant thicker tie straps 150 have the propensity to be much more notch sensitive especially at the sharp inside corners of the inner edges 57 that follow the undulating plurality of intersections of the serrations 56a and rails 54a, and thus can fracture. Therefore, the new and improved strap cross section is considerably thinner. However, with the new thinner straps, it was impossible to completely fill the fifteen inch tie strap cavities in an injection mold, and the strength of the tie straps was reduced proportionally to the reduced strap thickness. Thus, the rails 54 of the new and improved button head tie have been greatly increased to provide:

(1) a flow path to fill the fifteen inch long tie strap cavities, and (2) increase the tensile strength of the tie strap by increasing the cross section area (see FIG. 11 versus FIG. 11A).

It should also be noted that there are limits to the rail 54 width. That is, too wide of a rail 54 will result in:

(1) premature filling of the tie strap rails during the injection molding process which traps air in the serrations area. This results in not being able to fill all the serrations with plastic; and (2) too narrow of serrations will not provide the required engagement between wedge teeth and strap serrations necessary to obtain the maximum loop tensile strength of the button head tie. Therefore the rails 54 in the new and improved button head tie of the present invention have been engineered to provide the overall optimal performance.

By way of dimensional comparison, it is to be noted that the length of the tie strap of the prior art $[L_1]$ is essentially equal to the length of the tie strap of the present invention $[L_2]$, whereby $L_1=L_2$. The same is true of the tie strap width $[W_1$ and $W_2]$, whereby $W_1=W_2$. On the other hand, the thickness of the tie strap of the present invention $[T_2]$ is approximately three-fourths, or seventy-five percent, of the thickness of the tie strap of the prior art $[T_1]$, whereby $T_2=(0.75)T_1$. A similar difference in tie strap cross-sectional area is to be noted, where the area of the tie strap of the present invention $[X_2]$ is approximately eight-tenths, or eighty percent, of the cross-sectional area of the tie strap of the prior art $[X_1]$ such that $X_2=(0.80)X_1$. This leads to an interesting proportionality whereby the ratio of the tie strap cross section to the strap thickness $[X_2/T_2]$ is greater in the tie strap of the present invention than in the same ratio $[X_1/T_1]$ in the tie strap of the prior art, or $X_2/T_2>X_1/T_1$. Finally, it should be noted that the rail width of the tie strap of the present invention $[RW_2]$ is proportionately wider relative to the overall strap width, where $RW_2=(\frac{1}{4})W_2$, than that of the rail width of the tie strap of the prior art $[RW_1]$ where $RW_1=(\frac{1}{10})W_1$, approximately.

The elongate portion 70 of the tie strap 50 also includes side walls 76, 78. The distance between each of the side walls 76, 78 is slightly smaller than the distance between the complementary opposing side walls 48 of the button head aperture 40. The tail 79 of the elongate portion 70 that is opposite the wedge 60 is tapered slightly inwardly. The tail 79 assists the installer in introducing the tail 79 of the tie strap 50 into the aperture 40 of the button head 20 during assembly.

Figure 2:
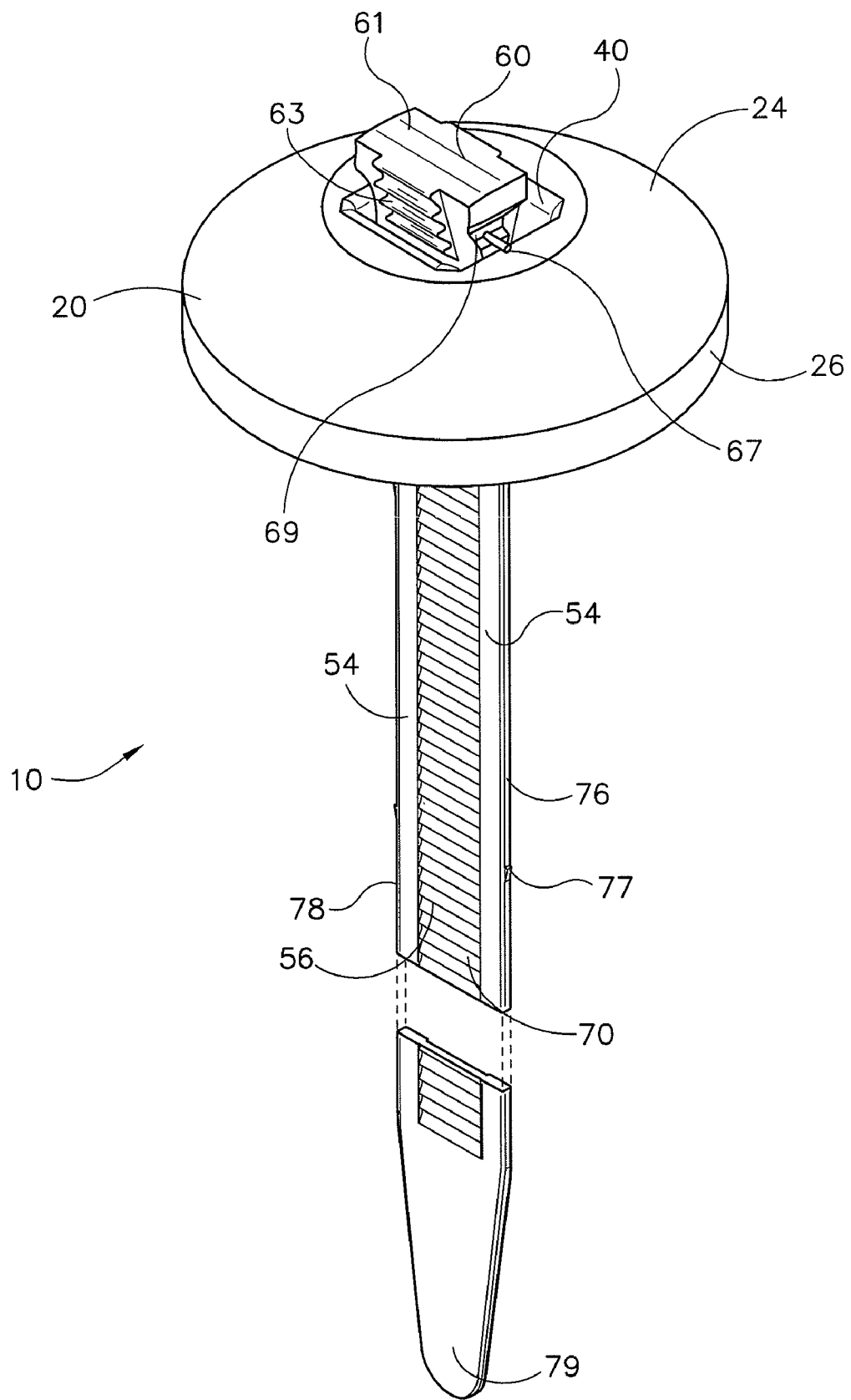
FIG. 2 is a front, top and right side perspective view of the improved button head tie illustrated in FIG. 1, displaying the components preassembled in the "as received" arrangement in preparation for installers to secure an elongated item or bundle of elongated items.
Figure 2C:
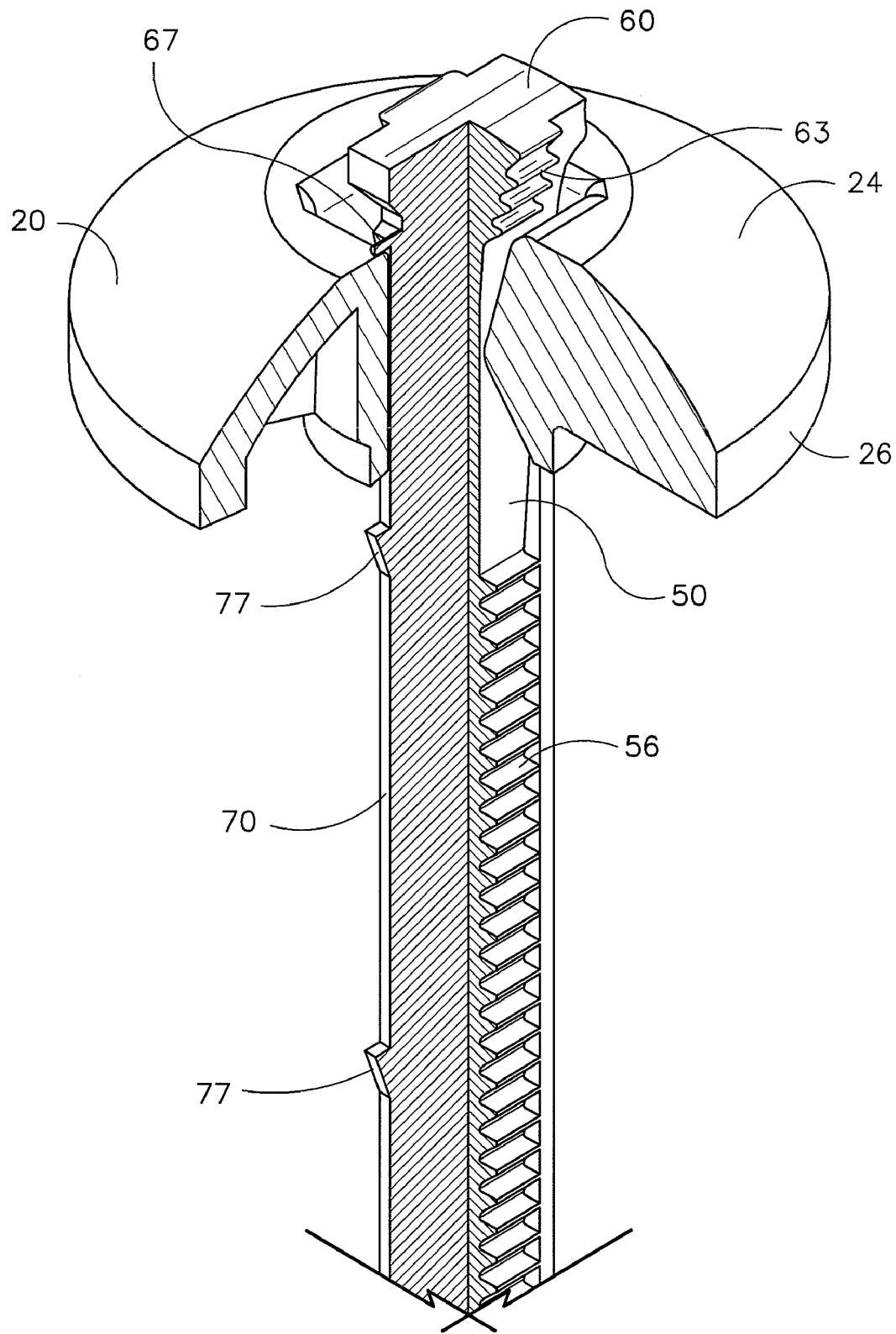
FIG. 2C is a further enlarged and partially-sectioned view of the improved button head tie shown in FIG. 2.
Figure 3:
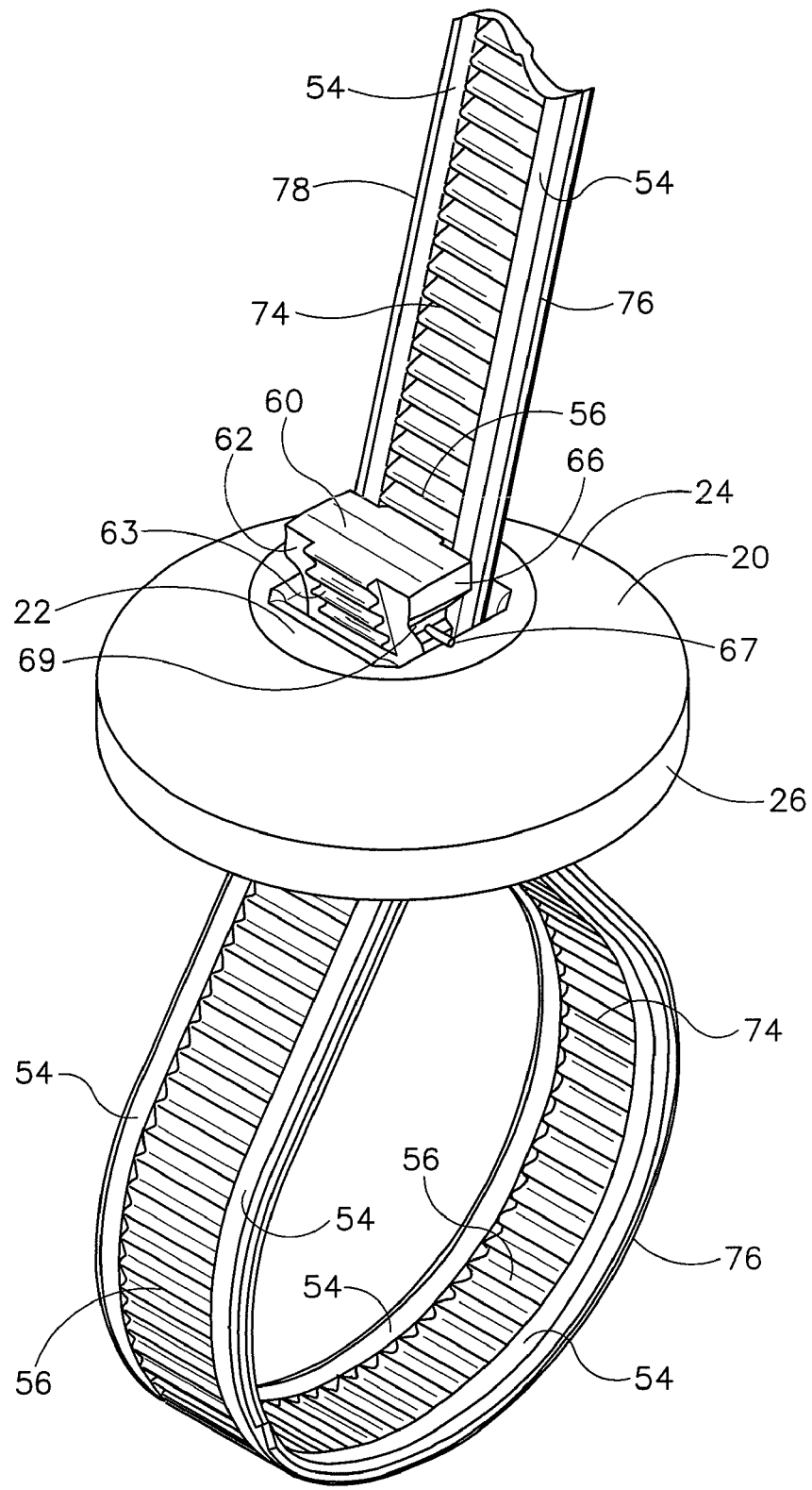
FIG. 3 is a front, top and right side perspective view of the improved button head tie illustrated in FIGS. 1 and 2, displaying the strap looped and inserted back into the button head—initially engaging the wedge teeth against the strap serrations as would be performed to encircle and secure an elongated item or a bundle of elongated items.
Figure 4:
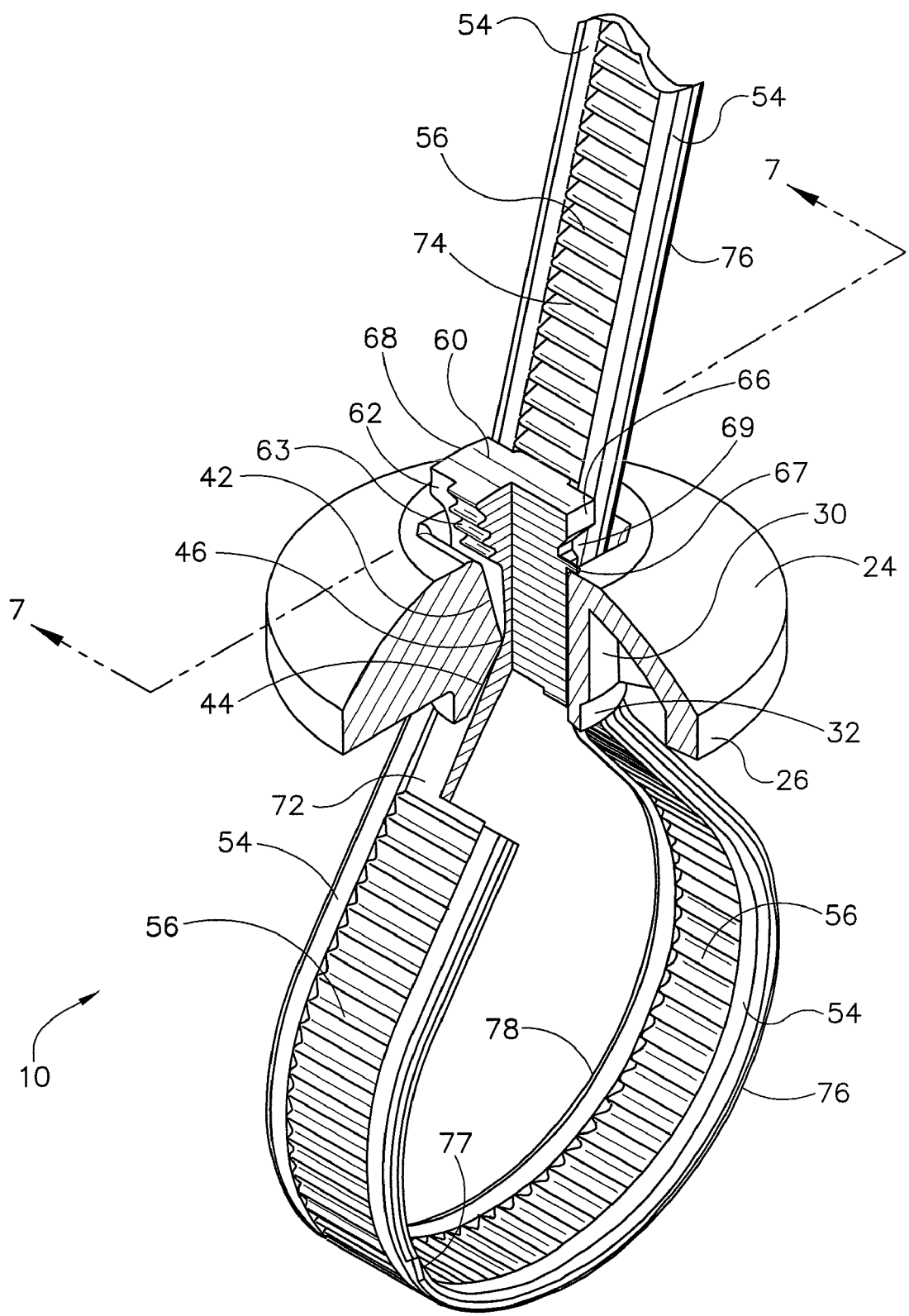
FIG. 4 is a partially-sectioned view of the improved button head tie similar to that illustrated in FIG. 3.
Figure 5:
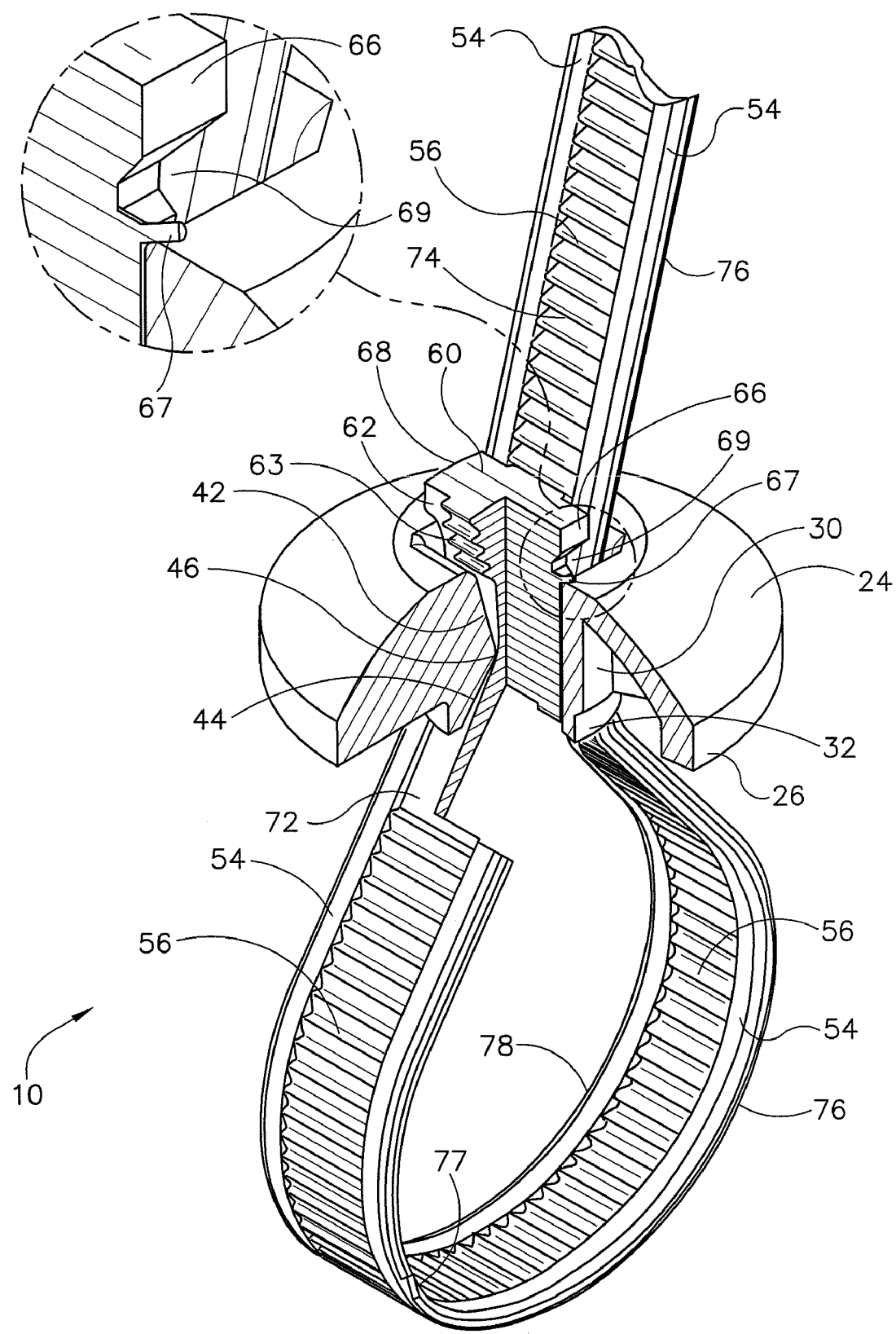
FIG. 5 is another partially-sectioned view of the improved button head tie that is similar to that illustrated in FIG. 4, however, displaying the strap wedge beginning to be pulled downwardly and into the aperture of the button head.
Figure 7:
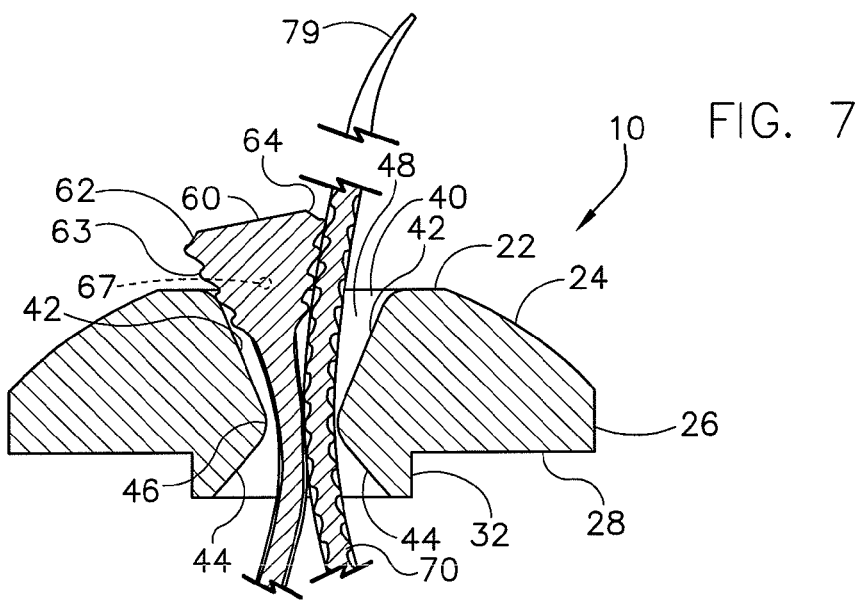
FIG. 7 is an enlarged cross-sectioned right side elevational view of the improved button head tie taken along line 7-7 of FIG. 4 displaying the wedge teeth as being not engaged with the strap serrations.
Figure 7A:
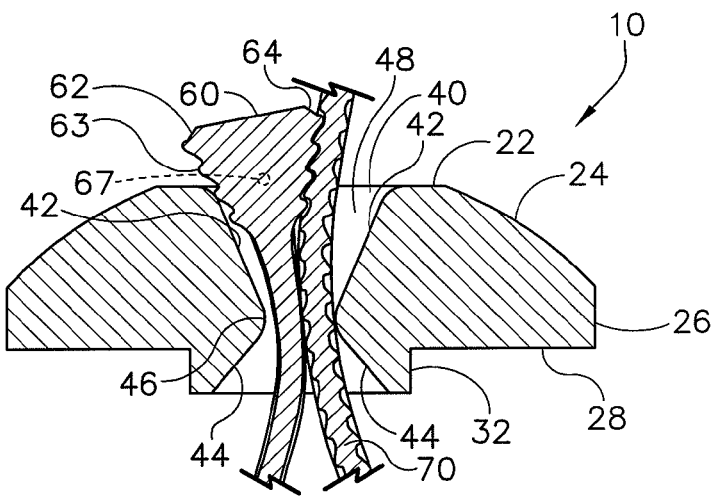
FIG. 7A is an enlarged cross-sectioned right side elevation view of the improved button head tie taken along line 7-7 of FIG. 4 displaying the wedge teeth as being engaged with the strap serrations.

Situated along the side walls 76, 78 of the elongate portion 70 of the tie strap 50 are a number of opposing retainers 77. Also situated along the side walls 66 of the wedge 60 are a number of opposing standoff tabs 67. During production of the button head tie 10, the strap 50 is preassembled into the button head 20. See FIGS. 2 and 2C. The uppermost set of opposing retainers 77 situated closest to the wedge 60 and the standoff tabs 67 retain the button head 20 so that the button head 20 slides between the standoff tabs 67 and the retainers 77; therefore, the travel distance between the standoff tabs 67 and the retainers 77 is slightly larger than the total height of the button head 20 between the top surface 22 and the bottom of the pilot bushing 32. This forces the wedge 60 of the strap 50 to remain in the vicinity of the aperture 40 of the button head 20 as shown in FIG. 2C. This creates a diversion path for the strap 50 during the installation while inserting the strap 50 back into the aperture 40. See FIG. 7. When the installer is bundling elongate items and inserting the strap back through the bottom of aperture 40, the tail 79 and sub-sequentially the strap serrations 56 pass against the wedge teeth 63 forcing now two strap 50 sections within the aperture to slightly bend about the bottleneck region 46 of the aperture 40, applying a preload condition at the point of engagement between the wedge teeth 63 and the strap serrations 56 resulting in an audible "click, click, click" or ratcheting sound. See FIGS. 7 and 7A. This assures the installer of initial engagement of the strap serration 56 to wedge teeth 63 and provides light retention of the secondary inserted strap—assisting the installer by temporarily looping bundles. See FIG. 7A.

Figure 13:
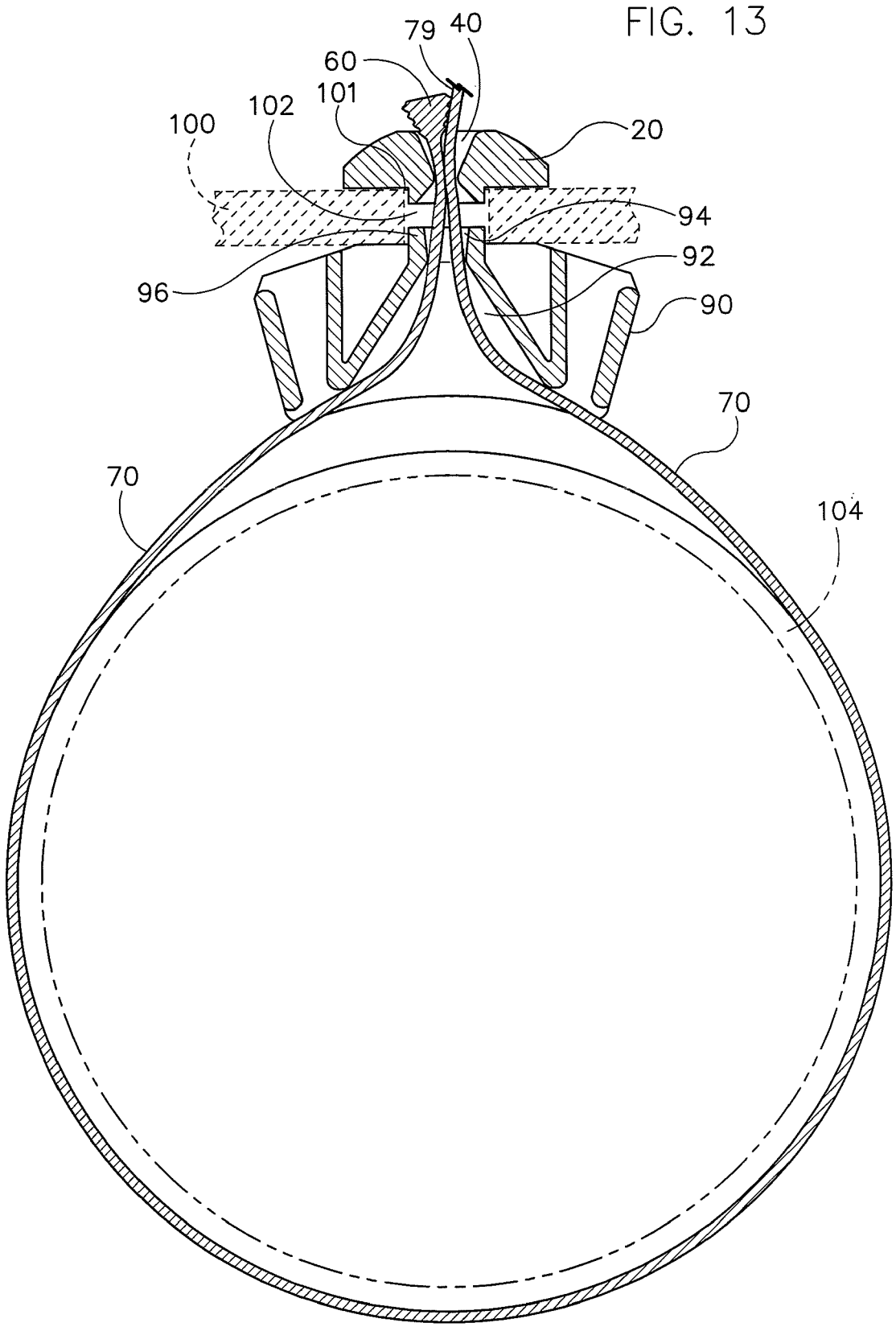
FIG. 13 is a side elevational and cross-sectioned view of the improved button head tie of the present invention—assembled to a saddle mount, a bundle, and a supporting structural member. Low tension was applied to the strap resulting in initial engagement of the wedge teeth against the strap serrations.
Figure 14:
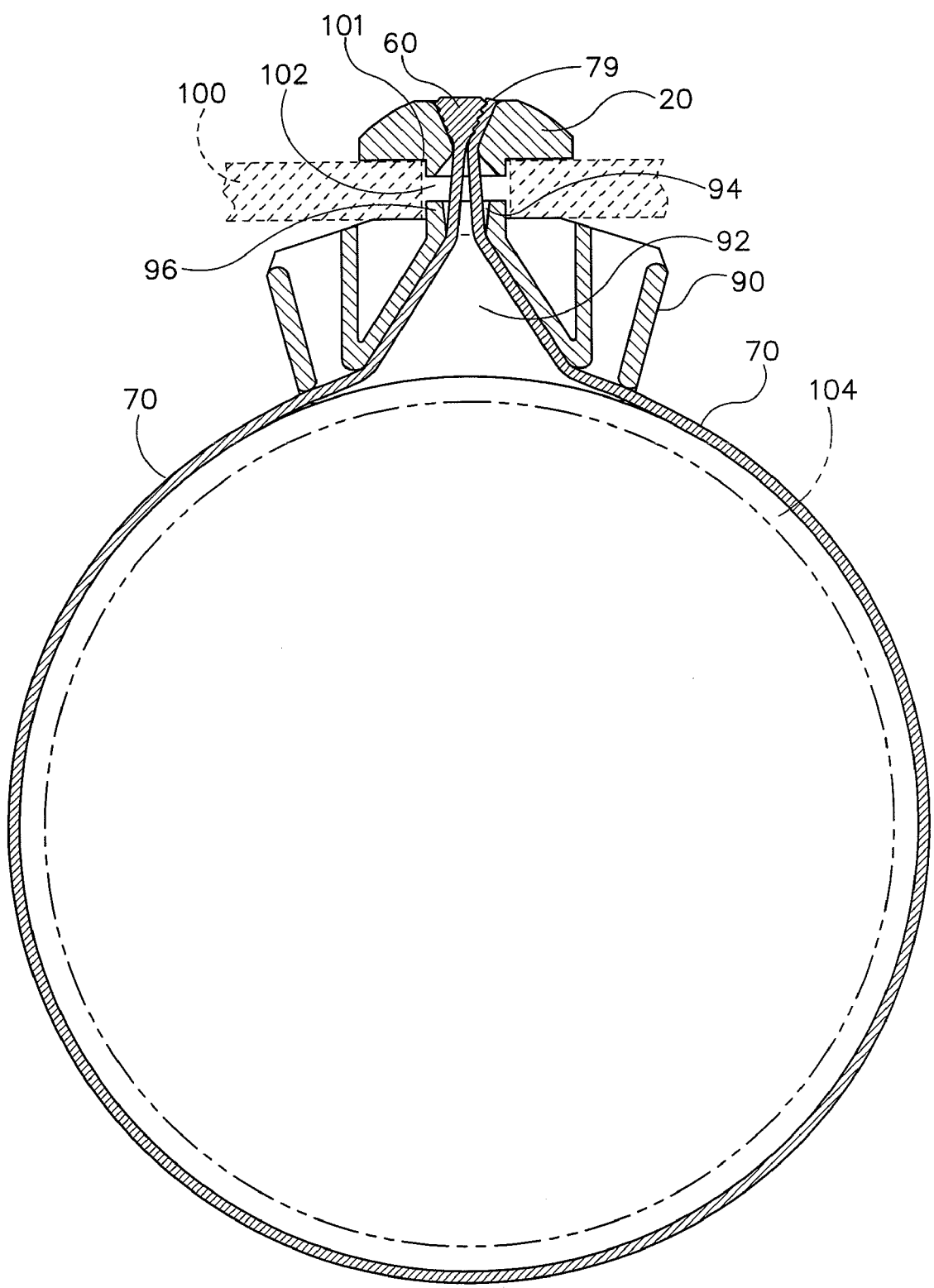
FIG. 14 is a view similar to that illustrated in FIG. 13; however, high tension was applied to the strap resulting in seating of the wedge and providing compressed engagement of the wedge teeth against the strap serrations. Also the strap was cutoff flush with the top surface of the button.

The width of the elongate portion 70 is only slightly smaller than the width of the aperture 40 of the button head 20. The retainers 77 do not extend outwardly substantially, but only enough to provide some resistance to disengagement. Additional sets of retainers 77 may be disposed further away from the wedge 60 to allow for the temporary holding of a saddle 90 in position, as shown in FIGS. 13 and 14.

An alternative embodiment of the tail 79a of the elongate portion 70a is shown in FIGS. 2A and 2B. It includes a plurality of conics 71a extending outwardly from the front face surface 72a and from the back face surface 74a of the tail 79a. The conics 71a add tactile grip and feel for the installer during insertion of the strap tail 79a to the aperture 40 of the button head 20 and during "pull through" of the elongate portion 70.

Referring to FIG. 19, it will be seen that the installer must insert the tail 79 of the strap 50 through the mounting aperture 102 from one side of the mounting structure 100 pulling the strap 50 through from the opposite side of the mounting structure 100 until the planar bottom base 28 of the button is mating against the mounting structure 100 and the pilot bushing 32 of the button 20 is seated inside of the mounting aperture 102. At this point, it is optional for the installer to loop the elongate bundle 104 either clockwise or counter clockwise with the strap 50, and next insert the tail 79 along either side 72, 74 of the protruding strap 50 through the mounting aperture 102, then through the button aperture 40. This provides a bi-directional insertion of the strap 50 which makes installation easier and faster. During the tail 79 insertion, the tail 79 will be forced to be properly orientated and guided by the lower lead-in ramps 44 and between the bottle neck region 46, regardless of which side of the elongate portion 70 of 20 the tie strap 50 the installer is viewing during insertion. It should be noted that the mounting hole 102 orientation displayed is horizontal with the elongate bundle 104 being suspended over head. However, vertical or any other mounting hole 102 orientation can be utilized without deviating from the scope of the present invention.

Figure 17A:
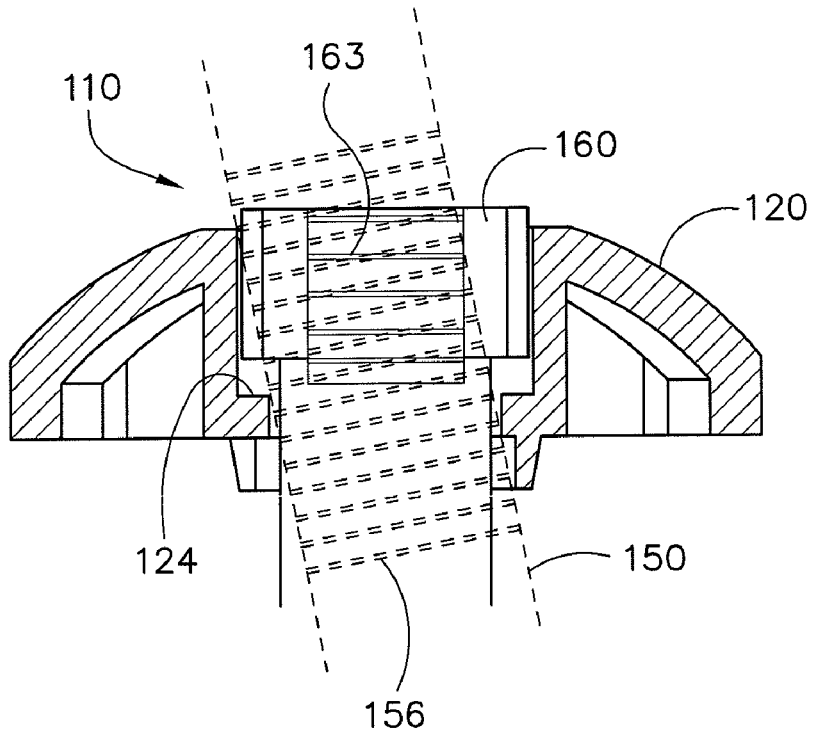
FIG. 17A is a sectioned front elevational view of the prior art button head and tie strap illustrating cross-threading due to misalignment of the strap serrations against the wedge teeth.
Figure 17B:
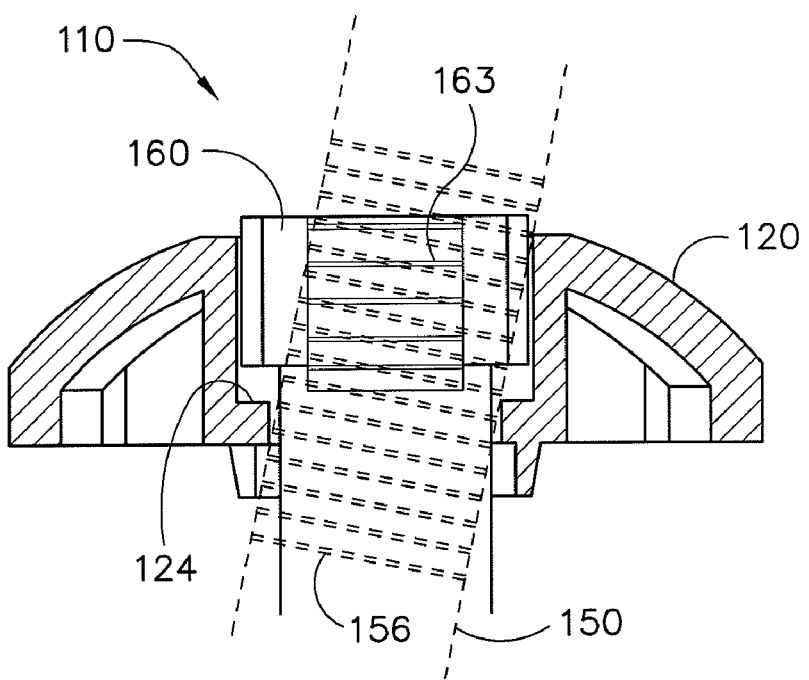
FIG. 17B is another sectioned view similar to FIG. 17A and again showing cross-threading due to misalignment of the strap serrations against the wedge teeth.

A major new improvement of the present invention is the single plane, side walls 76, 78 of the strap 50, aligned with the side walls 66 of the wedge 60. Both are in mating contact with the narrowed configuration and tight-fitting, single plane, side walls 48 of the aperture 40 in the button head 20. Together, both components prevent the angled insertion of the tie strap 50 which occurred with the prior art button head ties 110 as displayed in FIGS. 17A and 17B. The new and improved aforementioned features force proper alignment of the teeth 63 of the wedge 60 with the serrations 56 of the strap 50 as displayed in FIGS. 3-6.

Referring back to FIGS. 17A and 17B, both of the extreme conditions of angled insertion are illustrated; whereby the orientation between the prior art tie strap 150 and its serrations 156 all shown in phantom lines relative to the solid lines and sectioned view of the prior art button head 120. In either orientation, it is evident that the prior art teeth 163 of the wedge 160 will not properly align with the prior art serrations 156 of the tie strap 150, thus preventing proper meshing and engagement of the teeth 163, and serrations 156. With such misalignment, the tie strap 150 will freely slide across the wedge 160 without any engagement between those two elements. The prior art utilizes a shelf or "step" 124 in the aperture 140 of the button head 120 and the mating wedge 160 that functionally cooperates with and has a mating step surface 164 that is defined within each of the supporting edges 162 of the wedge 160. The misalignment is due to the setback area 123 required in the aperture 140 to create a nesting area for the supporting edge 162 of the wedge 160 which creates excessive clearance for the elongate portion 170 of the tie strap 150. Only when the tie strap 150 is presented in a more closely parallel alignment with the wedge 160 will the serrations 163 and the teeth 156 engage and properly seat, requiring the installer to monitor strap 150 installation angles or risk the inadvertent release of bundles. In the new and improved present invention, the single plane, side walls 76, 78 of the strap 50 aligned with the side walls 66 of the wedge 60 mating against the narrowed configuration and tight-fitting, single plane, side walls 48 in the aperture 40 of the button head 20, prevents angled insertion of the strap 50 and inadvertent release of bundles 104.

During the production stage of the button head tie 10, the strap 50 is pre-assembled and inserted downwardly into the aperture 40 of the button head 20 until the uppermost set of strap retainers 77 contact the corner of top surface 22 and the aperture 40 of the button head 20. Each retainer 77 is configured with a ramp-like member having a flat 87 at the top portion of the retainer 77. The retainer 77 has sufficient resiliency to allow some deformation and clearance of the retainer 77 between the side walls 48 of the button head aperture 40. Once that portion of the tie strap 50 that contains the retainer(s) 77 passes fully through the aperture 40, however, the flat 87 at the top portion of the retainer 77 provides some resistance to the tie strap 50 being pulled back out from the aperture 40 and thus being separated from the button head 20. That is, the flat 87 effectively catches against the bottom of the pilot bushing 32. Where the pilot bushing 32 is not provided, the flat 87 would catch against the planar bottom base 28 of the button head 20. The retainer(s) 77 allow the manufacturer to pre-assemble the button head 20 with the tie strap 50 allowing the end user to install the button head tie 10 in a simple and fast method.

Another major new improvement present invention is the addition of standoff tab(s) 67 to the wedge 60. With the strap 50 preassembled into the button head aperture 40 (as shown in FIG. 2), the wedge 60 is partially elevated above the top surface 22 of the button head 20 by the standoff tabs 67. The stand-off tabs 67 temporarily rest on the button head's 20 top surface 22. The function of the stand-off tabs 67 is to prevent the wedge 60 from seating into the aperture 40 until the installer applies a sufficient amount of tension to the tie strap 50 during bundling and securing cables, harnesses, hoses, etc. to the mounting structure. See FIGS. 2-4. With the wedge 60 slightly elevated above the button head 20 and not within the aperture 40, the installer's strap insertion force is significantly reduced. The installer loops the bundle and then inserts the tail 79 up along either side 72 or 74 of the protruding strap 50 through the mounting aperture 102, then the strap easily feeds through the button aperture 40 because strap clearance is provided with the wedge 60 elevated. See FIGS. 3, 4, 7 and 7A.

An additional benefit of the device of the present invention is that it allows for easy release of the strap 50 when a bundle is looped and the strap serrations 56 are initially engaged with the wedge teeth 63. This easy release is due to: (1) the standoff tabs 67 partially elevating the wedge 60 above the button head aperture 40 and (2) the rounded teeth 63 engaging rounded serrations 56. The easy release condition requires that low circumferential loop tension be applied to the strap 50 so as to not collapse the standoff tabs 67 and not drive the wedge 60 down into the button head aperture 40. To release, the installer simply pulls the elevated wedge 60 away from the initially engaged strap 50; then the strap 50 is easily backed out of the button head 20 to undo the engaged loop. This release process is made easier with the rounded teeth 63 and matching rounded serrations 56; if both components were sharp mating features, backing out the strap 50 would be far more difficult. This is beneficial during the layout of routing wire harnesses, cables, hoses, etc. when additional wire harnesses, cables, hoses, etc. need to be added later during the assembly process.

To elaborate, this "release" feature of the present invention provides extremely versatile usage in many applications and in many industries. For example, when using the new and improved button head tie 10 on an assembly line application, one variation is shown in FIG. 13, the tie strap 50 can be loosely cinched while using an optional saddle mount 90 to secure a bundle 104 of elongated items such as wire harnesses, cables, hoses, etc. in their routing location. Later on during the assembly, if another elongate item needs to be added to the existing bundle 104 and the wedge 60 has not been seated, the strap 50 can be backed out of the aperture 40 thereby opening the initially engaged loop. Then additional elongate items can be inserted into the bundle and reassembled and re-secured with the button head tie 10.

When using the optional saddle mount 90, which is of the type disclosed in U.S. Pat. No. 6,533,226 issued to Geiger, it should be noted that the saddle mount 90 would include a first aperture 92 and a more constricted second aperture 94, the second aperture being surrounded by a pilot bushing 96 which is similarly seated within the structure aperture 102 opposite the pilot bushing 32 of the button head 20. The more constrictive second aperture 94 of the saddle mount 90 engages the lowermost set of retainers 77 furthest from the wedge 60 "loosely locking" in and sandwiching the mounting surface between the button head's 20 planar bottom base 28 and the saddle mount's 90 bottom base surface. This is termed "loosely locking" because the distance between the uppermost retainers 77 and the lowermost retainers 77 along the strap 50 is greater than the thickness of the mounting surface 100. In application, the elongate portion 70 of the tie strap 50 passes into and out of each saddle mount aperture 92, 94 twice, effectively threading the elongate portion 70 through those apertures 92, 94. It is to be understood that other attachment assemblies known to those skilled in the art may be used with the new and improved button head tie 10 of the present invention.

Figure 6:
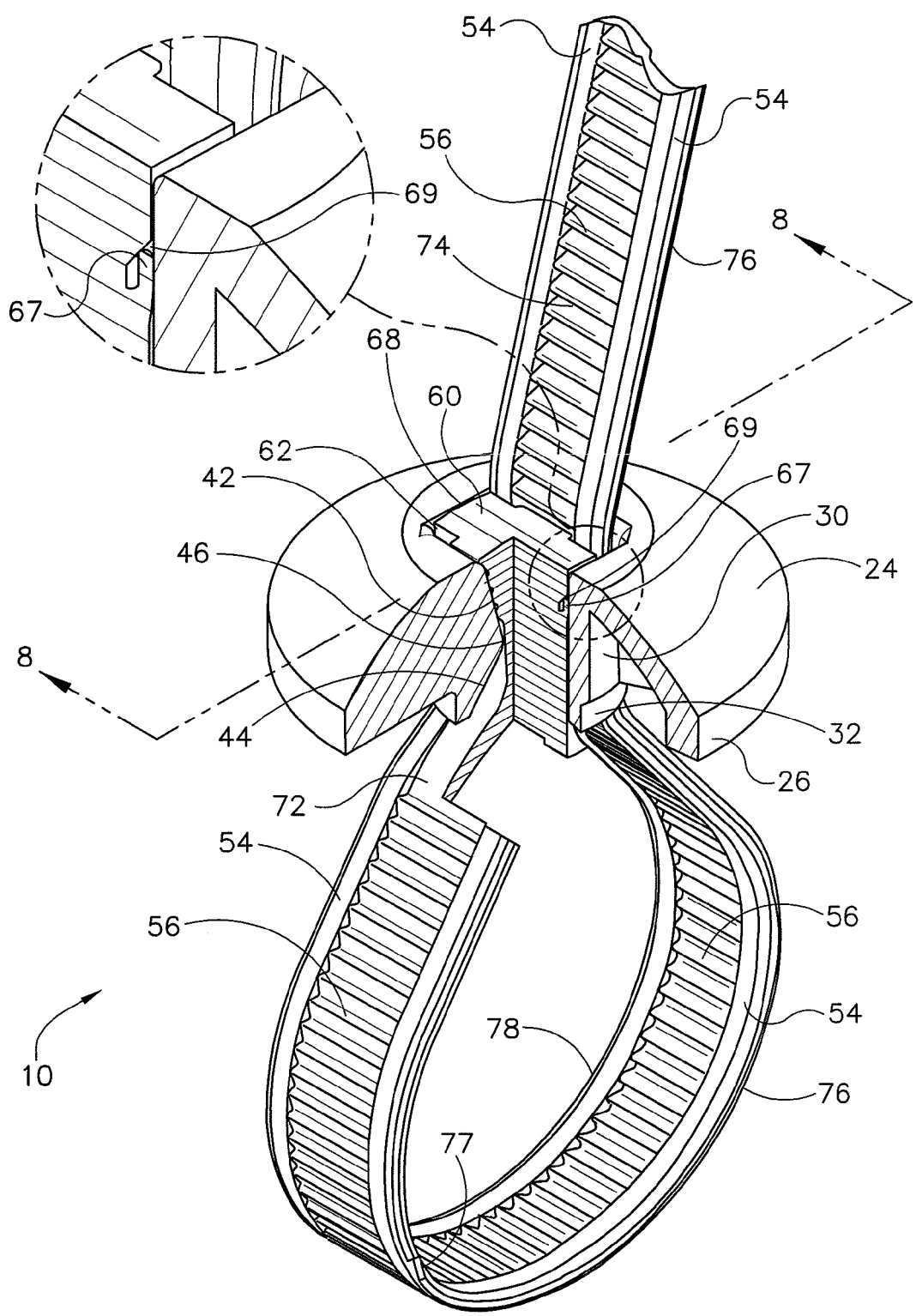
FIG. 6 is another partially-sectioned view of the improved button head tie that is similar to that illustrated in FIGS. 4 and 5, however, displaying the wedge completely seated in the button head and providing compressed engagement of the wedge teeth against the strap serrations.

Once the elongate portion 70 of the tie strap 50 is in proper position relative to the objects 104 to be bundled, and all objects 104 intended to be bundled are bundled loosely, the tension on the elongate portion 70 is increased sufficiently to begin to collapse the outwardly extending stand-off tabs 67 into the tab recesses 69. See FIG. 5 and magnified view. Further tensioning of the strap 50 pulls the wedge 60 downwardly along one of the upper lead-in ramps 42 of the aperture 40 and into the aperture 40, which compressively forces engagement of the wedge teeth 63 into the strap serrations 56. The compressive engagement is illustrated in FIG. 6 and magnified view, and in FIGS. 8 and 14.

In the compressive engagement, the top surface 61 of the wedge 60 is substantially flush with the top surface 22 of the button head 20. That portion of the strap 50 that extends above the top surface 22 of the button head 20 can be trimmed and removed, thus completing installation. See FIG. 14.

Figure 18A:
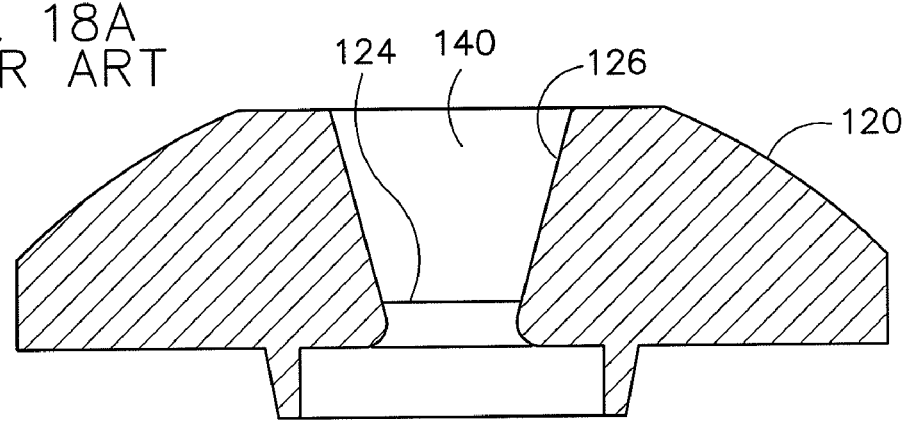
FIG. 18A is a sectioned left side elevational view of the prior art button head, of the type illustrated in FIGS. 17A and 17B.
Figure 18B:
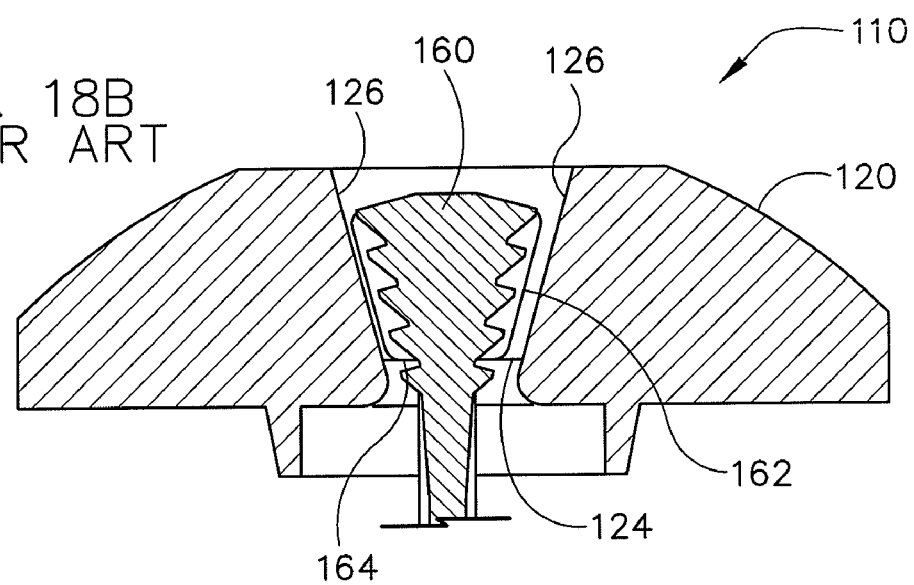
FIG. 18B is the same sectioned elevational view of the prior art button head shown in FIG. 18A together with the wedge of the prior art tie strap of the type shown in FIGS. 15A-15C.
Figure 18C:
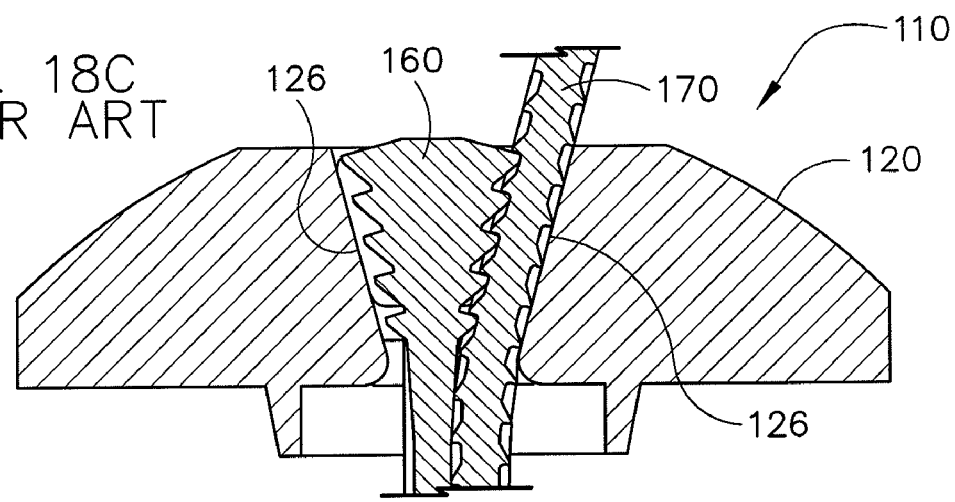
FIG. 18C is a view similar to FIG. 18B of the prior art additionally displaying a portion of the tie strap fully engaged against the wedge inside the button head.

Reference is again made to the prior art button head 120 and tie strap 150 illustrated in FIGS. 16A-16C and FIGS. 15A-15C, respectively. As alluded to earlier, the prior art button head 120 includes an aperture 140 having a pair of opposing shelves or steps 124. Now, see also FIGS. 18A through 18C, the tie strap 150 of the prior art comprises a wedge 160 that functionally cooperates with and has a mating step surface 164 that is defined within each of the supporting edges 162 of the wedge 160. That is, the bottom-most portion of the supporting edge 162 comprises a pair of mating step surfaces 164, configured to be supported by the shelves or steps 124 that are defined within the button head aperture 140. As will be apparent to one skilled in the art, the step surfaces 164 and steps 124 prevent the wedge 160 from being pulled too far downwardly and into the aperture 140. This effectively "limits" the amount of "wedging" that can be accomplished by these two prior art components which also limits the overall loop tensile strength.

Figure 15D:
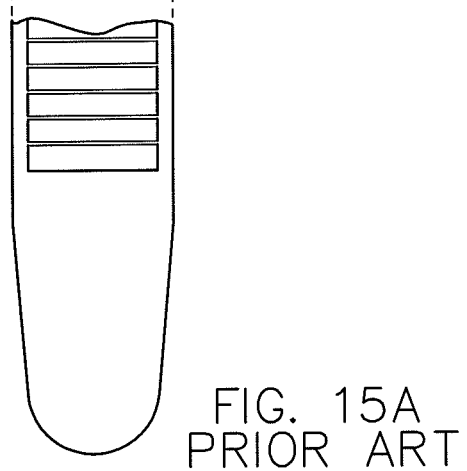
FIG. 15D is a view, similar to FIG. 15C, of the tie strap wedge of the present invention taken along line 15D-15D of FIG. 1.

In contrast, the new and improved button head tie provides unlimited wedging because the prior shelves or steps 124 and mating step surfaces 164 have been reconfigured and replaced by the single plane, aligned geometry, and further reconfigured and replaced with the standoff tabs 67. Unlimited wedging translates into increased wedging. To oppose the allowed increased wedging, the wedge 60 angle was increased by approximately 50%, from approximately 30° to approximately 45° shown on FIGS. 15C and 15D which restrains the higher loop tensile loads by preventing the wedge 60 from pulling all the way through the aperture 40. To counteract the increased wedging forces encountered by the increased wedge 60 angle-extensive strengthening of the button head 20 was required and accomplished by adding the network of radially-disposed ribs 34 around the centrally-disposed hub 30 and aperture 40. The aforementioned features, of the new and improved button head tie 10, work together to achieve increased wedging, a stronger lock on the strap 50 and increased loop tensile strength. Note this increased loop tensile strength is accomplished while the strap 50 cross section was reduced which provides a reduction of material usage and reduced manufacturing costs.

The failure mode at peak loading of the prior art button head tie, looped assembly, was the strap 150 would pull through the "limited" compression engagement of the wedge 160 teeth 163 against the strap 150 serrations 156. The compression engagement is termed "limited" because of the step surfaces 164 and steps 124 limited the wedging. In contrast, the failure mode at peak loading of the new and improved button head tie looped assembly is the strap 50 stretches until the strap cross section necks down (reduces in cross section) just below the wedge 60 teeth 63 compressed engagement with the strap 50 serrations 56. After the strap 50 necks down, the strap 50 normally breaks at the necked down region. This peak failure load limit of the new and improved button head tie 10 is significantly higher than the peak failure load limit of the prior art button head tie 110.

Finally, it should be mentioned here that both the button head 20 and the tie strap 50 are each preferably injected molded from a strong, durable plastic, such as Nylon 6/6. However, any material that provides strength to the button head 20 and strength plus flexibility to the tie strap 50 would be acceptable.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. An improved button head tie for securing a bundle of elongate objects to a planar surface, the surface including an aperture, comprising
a button head, the button head being a generally planar structure comprising a top surface, a bottom surface, and a generally rectangular-shaped aperture defined within it and extending through it, the aperture comprising opposing upper lead-in ramps extending inwardly and downwardly from the top surface of the button head and further comprising opposing lower lead-in ramps extending inwardly and upwardly from the bottom surface, the upper lead-in ramps and the lower lead-in ramps being tapered inwardly and meeting at opposing ramp peaks to create a point of constriction within the aperture, and
a tie strap, the tie strap being a generally longitudinally-extending member that comprises a wedge, the wedge comprising opposing side walls, each of the opposing side walls further comprising an outwardly extending stand-off tab, the stand-off tab being positionable to temporarily rest the stand-off tab on the top surface of the button head to prevent the wedge from seating into the button head aperture, and a tab recess, the tab recess being defined within the wedge side wall and located above the stand-off tab, the stand-off tab further being deformable and designed to yield beyond its elastic limit, the tab recess being configured to receive the stand-off tab when the stand-off tab is deformed and bent upwardly as the stand-off tab yields beyond its elastic limit, and the tie strap further comprising an elongate portion extending from the wedge,
wherein the button head aperture is configured and dimensioned to receive the tie strap within it, the elongate portion of the tie strap being configured to pass through the aperture and the tie strap wedge being configured to be positionable above the top surface of the button head when the stand-off tabs are not deformed and the tie strap wedge further being configured to be captured within the aperture to secure the bundle of elongate objects to the surface at the surface aperture as the wedge is pulled downwardly into the button head aperture and as the stand-off tabs yield beyond their elastic limit, deform and are received within the tab recesses.

2. The button head tie of claim 1 wherein the button head includes a circumferential rim and a number of ribs extending radially inwardly from the circumferential rim.

3. The button head tie of claim 2 wherein the shape of the aperture at the top surface and at the bottom surface is generally rectangular.

4. The button head tie of claim 3 wherein the aperture includes a pair of opposing side walls, the side walls being substantially parallel planar surfaces that are disposed generally perpendicularly to the lead-in ramps.

5. The button head tie of claim 4 wherein the tie strap wedge has a front face surface, a back face surface, the front and back face surfaces each including a plurality of transversely-disposed teeth.

6. The button head tie of claim 5 wherein the teeth of the tie strap wedge begin at a top surface of the wedge and end at a point where the wedge joins the elongate portion of the tie strap.

7. The button head tie of claim 1 wherein the elongate portion of the tie strap is a generally flat and longitudinally-extending, strip-like member that includes a front face surface and a back face surface, the front and back face surfaces being configured to allow for bi-directional use of the tie strap.

8. The button head tie of claim 7 wherein the elongate portion of the tie strap further includes side walls, the distance between each of the side walls being dimensioned slightly smaller than the distance between the opposing side walls of the button head aperture.

9. The button head tie of claim 8 wherein the front and back face surfaces of the elongate portion of the tie strap each include longitudinally-extending and opposing side rails and a plurality of transversly-disposed serrations.

10. The button head tie of claim 9 wherein the side rails include slightly rounded outer edges and slightly rounded inner edges.

11. The button head tie of claim 10 wherein the serrations of the elongate portion of the tie strap are rounded.

12. The button head tie of claim 11 wherein the side walls of the elongate portion include at least one pair of retainers for keeping the tie strap engaged within the button head aperture.

13. The button head tie of claim 12 wherein the button head and the tie strap are each injected molded from a strong, durable plastic material.

14. The button head tie of claim 7 wherein the elongate portion of the tie strap includes a tail and a plurality of conics extending outwardly of the front and back surfaces of the tie strap at the tail.

15. An improved button head tie for securing a bundle of elongate objects to a planar surface, the surface including an aperture, which comprises
a button head, the button head being a generally planar structure comprising a generally rectangular-shaped aperture defined within it and extending through it, and
a tie strap, the tie strap being a generally longitudinally-extending member that comprises a wedge, the wedge comprising opposing side walls, each of the opposing side walls further comprising an outwardly extending stand-off tab, the stand-off tab being positionable to temporarily rest on the button head above the aperture to prevent the wedge from seating into the aperture, and a tab recess, the tab recess being defined within the wedge side wall and located above the stand-off tab, the stand-off tab further being deformable and designed to yield beyond its elastic limit, the tab recess being configured to receive the stand-off tab when the stand-off tab is deformed and bent upwardly as the stand-off tab yields beyond its elastic limit and the tie strap further comprising an elongate portion extending from the wedge,
wherein the button head aperture is configured and dimensioned to receive the tie strap within it, the elongate portion of the tie strap being configured to pass through the aperture and the tie strap wedge being configured to be positionable above the button head when the stand-off tabs are not deformed and the tie strap wedge further being configured to be captured within the aperture to secure the bundle of elongate objects to the surface at the surface aperture as the wedge is pulled downwardly into the button head aperture and as the stand-off tabs yield beyond their elastic limit, deform and are received within the tab recesses.

16. The button head tie of claim 15 wherein the button head includes a top portion, a spherical sloped portion that extends downwardly from the top portion, and a circumferential rim, and wherein the top portion of the button head includes a centrally-disposed aperture, the aperture extending fully through the button head and wherein the stand-off tab is positionable to temporarily rest stand-off tab on the top portion of the button head.

17. The button head tie of claim 16 wherein the button head includes a substantially planar bottom portion and a pilot bushing extending downwardly from the bottom planar portion of the button head, the pilot bushing being configured to properly seat the button head within the aperture of the surface.

18. The button head tie of claim 17 wherein the button head includes a central core and a number of ribs extending radially outwardly to the circumferential rim.

19. The button head tie of claim 18 wherein the aperture is centrally-disposed and extends fully through the central core of the button head from the top surface to the pilot bushing.

20. The button head tie of claim 19 wherein the shape of the aperture at the top surface and at the pilot bushing is generally rectangular.

21. The button head tie of claim 20 wherein the side elevational profile of the aperture is generally hourglass-shaped bottle neck portion within the aperture.

22. The button head tie of claim 21 wherein the aperture includes opposing upper lead-in ramps extending inwardly and downwardly from the top surface of the button head and further includes opposing lower lead-in ramps extending inwardly and upwardly from the pilot bushing, the upper lead-in ramps and the lower lead-in ramps being tapered inwardly and meeting at opposing ramp peaks that create a point of constriction within the aperture.

23. The button head tie of claim 22 wherein the aperture includes a pair of opposing side walls, the side walls being substantially parallel planar surfaces that are disposed generally perpendicularly to the lead-in ramps.

24. The button head tie of claim 23 wherein the tie strap wedge has a front face surface, a back face surface, and opposing side walls, the front and back face surfaces each including a plurality of transversely-disposed teeth.

25. The button head tie of claim 24 wherein the teeth of the tie strap wedge begin at a top surface of the wedge and end at a point where the wedge joins the elongate portion of the tie strap.

26. The button head tie of claim 25 wherein the opposing side walls of the wedge each includes an outwardly extending stand-off tab.

27. The button head tie of claim 26 wherein the opposing side walls of the wedge each includes a tab recess located above stand-off tab, the tab recess being configured to receive the tab when the tab is bent upwardly.

28. The button head tie of claim 27 wherein the elongate portion of the tie strap is a generally flat and longitudinally-extending, strip-like member that includes a front face surface and a back face surface, the front and back face surfaces being similarly configured to allow for bi-directional use of the elongate portion.

29. The button head tie of claim 28 wherein the elongate portion of the tie strap further includes side walls, the distance between each of the side walls of the elongate portion being dimensioned slightly smaller than the distance between the opposing side walls of the button head aperture.

30. The button head tie of claim 29 wherein the front and back face surfaces of the elongate portion of the tie strap each include longitudinally-extending and opposing side rails and a plurality of transversely-disposed serrations.

31. The button head tie of claim 30 wherein the side rails include slightly rounded outer edges and slightly rounded inner edges.

32. The button head tie of claim 31 wherein the serrations of the tie strap are rounded.

33. The button head tie of claim 32 wherein the side walls of the elongate portion include at least one pair of retainers for keeping the tie strap engaged within the button head aperture.

34. The button head tie of claim 33 wherein the button head and the tie strap are each injected molded from a strong, durable plastic material.

35. The button head tie of claim 34 wherein the serrations of the front face surface of the elongate portion of the tie strap are offset from the serrations of the back face surface.

36. The button head tie of claim 28 wherein the elongate portion of the tie strap includes a tail and a plurality of conics extending outwardly of the front and back surfaces of the tie strap at the tail.

37. The button head tie of claim 28 wherein the elongate portion of the tie strap of the present invention has a thickness $T_2$, the elongate portion of a tie strap of the prior art has a thickness $T_1$, and $T_2=(0.75)T_1$ approximately.

38. The button head tie of claim 28 wherein the elongate portion of the tie strap of the present invention has a cross-sectional area $X_2$, the elongate portion of a tie strap of the prior art has a cross-sectional area $X_1$, and $X_2=(0.80)X_1$ approximately.

39. The button head tie of claim 28 wherein the elongate portion of the tie strap of the present invention has a strap width $W_2$ and a rail width $RW_2$, the elongate portion of a tie strap of the prior art has a strap width $W_1$ and a rail width $RW_1$, and wherein $RW_2=(1/4)W_2$ approximately and $RW_1=(1/10)W_1$ approximately.

* * * * *